United States Patent
Kaneko et al.

(10) Patent No.: US 11,809,189 B2
(45) Date of Patent: Nov. 7, 2023

(54) PACKAGE DELIVERY SUPPORT SYSTEM, PACKAGE DELIVERY SUPPORT METHOD, NON-TRANSITORY COMPUTER-READABLE STORAGE MEDIUM STORING PROGRAM, AND MOBILE UNIT

(71) Applicant: TOYOTA JIDOSHA KABUSHIKI KAISHA, Toyota (JP)

(72) Inventors: Yusuke Kaneko, Nagoya (JP); Masato Endo, Nagakute (JP); Shinji Sassa, Ama (JP); Takahiro Shiga, Chiryu (JP); Yohei Tanigawa, Toyota (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 120 days.

(21) Appl. No.: 17/513,301

(22) Filed: Oct. 28, 2021

(65) Prior Publication Data
US 2022/0050466 A1  Feb. 17, 2022

Related U.S. Application Data

(63) Continuation of application No. 16/201,252, filed on Nov. 27, 2018, now Pat. No. 11,442,452.

(30) Foreign Application Priority Data

Dec. 27, 2017  (JP) .................... 2017-252500

(51) Int. Cl.
*G05D 1/02* (2020.01)
*G06Q 10/083* (2023.01)
(Continued)

(52) U.S. Cl.
CPC ........... *G05D 1/0212* (2013.01); *G06Q 10/08* (2013.01); *G06Q 10/083* (2013.01); *G06Q 50/00* (2013.01); *B60P 3/007* (2013.01); *G05D 1/0287* (2013.01)

(58) Field of Classification Search
CPC .... G05D 1/0212; G05D 1/0287; G06Q 10/08; G06Q 10/083; G06Q 50/00; G06Q 50/28; (Continued)

(56) References Cited

U.S. PATENT DOCUMENTS 9,786,187 B1 * 10/2017 Bar-Zeev ............. G08G 5/0069
10,303,171 B1   5/2019 Brady et al.
(Continued)

FOREIGN PATENT DOCUMENTS

CN   106096891 A   11/2016
CN   106886876 A    6/2017
(Continued)

OTHER PUBLICATIONS

Office Action issued to U.S. Appl. No. 16/201,252 dated Jan. 19, 2022.
(Continued)

*Primary Examiner* — Michael V Kerrigan
(74) *Attorney, Agent, or Firm* — Dinsmore & Shohl LLP

(57) ABSTRACT

A package delivery support system includes a mobile unit prepared in an area, and a sales server configured to acquire an intention of a user to purchase a product and transmit inquiry information as to whether an address or residence of a delivery destination is in an area in which the mobile unit is available, a delivery server configured to manage information regarding a package, and a management device configured to manage the mobile unit. The management device acquires at least one of a delivery request to deliver a package loaded on the mobile unit and a pickup request to pick up a package with the mobile unit, and supplies the mobile unit with an instruction for causing the mobile unit to move to a location specified by the at least one of the delivery request and the pickup request.

20 Claims, 18 Drawing Sheets

(51) Int. Cl.
  *G06Q 50/00* (2012.01)
  *G06Q 10/08* (2023.01)
  *B60P 3/00* (2006.01)

(58) Field of Classification Search
  CPC ......... G06Q 10/0833; G06Q 10/08355; G06Q 50/30; B60P 3/007; H04W 4/024; H04W 4/35
  See application file for complete search history.

(56) References Cited

U.S. PATENT DOCUMENTS

| | | |
|---|---|---|
| 2014/0370167 A1 | 12/2014 | Garden |
| 2015/0202770 A1 | 7/2015 | Patron et al. |
| 2016/0019497 A1 | 1/2016 | Carvajal |
| 2017/0236092 A1 | 8/2017 | High et al. |
| 2018/0205682 A1 | 7/2018 | O'Brien, V et al. |
| 2019/0012631 A1 | 1/2019 | Chatani |
| 2019/0019149 A1 | 1/2019 | Dixon et al. |
| 2019/0025819 A1 | 1/2019 | Ferguson et al. |
| 2019/0130770 A1 | 5/2019 | Di Benedetto et al. |
| 2020/0249047 A1 | 8/2020 | Balva |

FOREIGN PATENT DOCUMENTS

| | | |
|---|---|---|
| CN | 107133771 A | 9/2017 |
| JP | 2002-149769 A | 5/2002 |
| JP | 2006-206225 A | 8/2006 |
| JP | 5353949 B2 | 11/2013 |
| JP | 2015-069594 A | 4/2015 |
| JP | 2017-514198 A | 6/2017 |
| KR | 1020150140556 A | 12/2015 |
| RU | 2603554 C2 | 11/2016 |
| WO | 2013/148123 A1 | 10/2013 |
| WO | 2015/123224 A1 | 8/2015 |
| WO | 2015/171825 A1 | 11/2015 |
| WO | 2016117080 A1 | 7/2016 |
| WO | 2017115447 A1 | 7/2017 |

OTHER PUBLICATIONS

Notice of Allowance issued to U.S. Appl. No. 16/201,252 dated May 25, 2022.

Morizono, Yasuhiro, "Robot cat in Shonan, can the inconsistent business of home delivery be saved", Nihon Keizai Shimbun, Electronic Edition, May 18, 2017. (English translation of office action issued in JP2017-252500 provided).

* cited by examiner

FIG. 3

MOBILE UNIT MANAGEMENT INFORMATION T1

| MOBILE UNIT ID | AREA ID | CURRENT LOCATION | STATUS | SCHEDULE | LOADED PACKAGE | PACKAGE INFORMATION |
|---|---|---|---|---|---|---|
| 001 | AREA a | P1 | STOPPED | STATION A | NOT LOADED | — |
| 002 | AREA a | P2 | DELIVERING | DELIVERY LOCATION | LOADED | DELIVERY ID |
| 003 | AREA a | P3 | MOVING | STATION X | NOT LOADED | — |
| 004 | AREA a | P4 | PICKING UP | PICKUP LOCATION | NOT LOADED | — |

FIG. 4

T2: ADDRESS-AREA CORRESPONDENCE TABLE

| ADDRESS OR RESIDENCE | AREA ID |
|---|---|
| add1 | AREA a |
| add2 | |
| add3 | |
| add4 | |

FIG. 5

DELIVERY INFORMATION

T3

| DELIVERY ID | AREA ID | PACKAGE INFORMATION | DELIVERY TIME PERIOD | WHETHER MOBILE UNIT IS AVAILABLE | MOBILE UNIT ID | CURRENT LOCATION | TRANSFER LOCATION |
|---|---|---|---|---|---|---|---|
| 001 | AREA a | B1 | MORNING | AVAILABLE | 001 | P1 | |
| 002 | AREA a | B2 | AFTERNOON | AVAILABLE | 002 | P2 | |
| 003 | AREA a | B3 | 9-11 | AVAILABLE | 003 | P3 | |
| 004 | — | B4 | 17-19 | NOT AVAILABLE | | P4 | |

FIG. 6

| USER INFORMATION | | | | | | |
|---|---|---|---|---|---|---|
| USER ID | NAME | ADDRESS OR RESIDENCE | PHONE NUMBER | MAIL ADDRESS | DELIVERY DESTINATION INFORMATION | TERMINAL INFORMATION |
| 001 | | | | | | |
| 002 | | | | | | |
| 003 | | | | | | |
| 004 | | | | | | |

T4

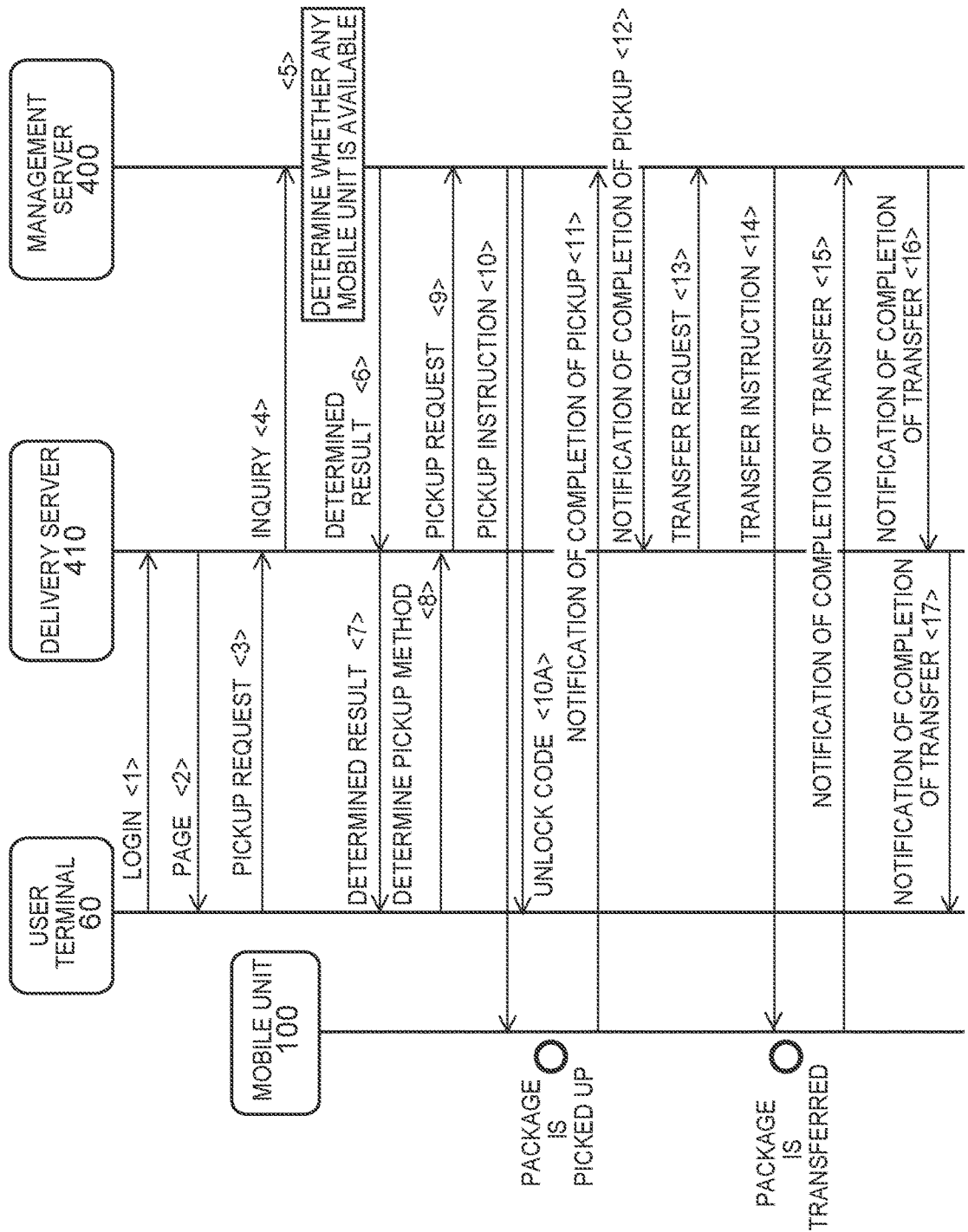

PACKAGE DELIVERY SUPPORT SYSTEM, PACKAGE DELIVERY SUPPORT METHOD, NON-TRANSITORY COMPUTER-READABLE STORAGE MEDIUM STORING PROGRAM, AND MOBILE UNIT

CROSS-REFERENCE TO RELATED APPLICATIONS

This application is a continuation of U.S. patent application Ser. No. 16/201,252 filed on Nov. 27, 2018 which claims priority to Japanese Patent Application No. 2017-252500 filed on Dec. 27, 2017, which is incorporated herein by reference in its entirety including the specification, drawings and abstract.

BACKGROUND

1. Technical Field

The disclosure relates to a package delivery support system, a package delivery support method, a non-transitory computer-readable storage medium storing a program, and a mobile unit.

2. Description of Related Art

When a product has been purchased through an online shopping service, a sales company that sells the product may entrust a delivery company with delivery of the product to a purchaser, and the delivery company may deliver the product to an address specified by the purchaser. As for such receipt of a package, such as a product, there is the following related art. For example, a recipient provides a receiving vehicle with an in-vehicle communication device and a trunk controller, and sets a trunk as a storage for a delivery article. When a home-delivery company delivers a delivery article, the home-delivery company performs mutual authentication with the receiving vehicle with the use of a business communication device provided in a vehicle of the home-delivery company, and puts the delivery article into the trunk. With this configuration, even in the absence of the recipient, the receiving vehicle is able to receive the delivery article in place of the recipient (for example, Japanese Unexamined Patent Application Publication No. 2006-206225 (JP 2006-206225A)). There is also the following related art. A mobile receiving station that can be associated with transportation, such as a public bus, is provided. A user may select a delivery method. The delivery method is a method in which an item is delivered to a mobile receiving station on a public bus that the user uses to go home from a company every day or a method in which an item is delivered to a mobile receiving station on a public bus that stops at a bus stop convenient for the user. The coordinates of the mobile receiving station are tracked with a GPS, or the like, and, when the mobile receiving station that stores an ordered item is approaching, a notification is provided to the user by cellular phone text-messaging, or the like (for example, Japanese Unexamined Patent Application Publication (Translation of PCT Application) No. 2017-514198 (JP 2017-514198 A)).

SUMMARY

With the technique described in JP 2006-206225 A, a delivery company is required to deliver a package to a receiving vehicle, so there can be cases where a delivery company cannot efficiently deliver a package, including, for example, the case where a distance from a delivery center to a receiving vehicle is long. With the technique described in JP 2017-514198 A, an item is received at a mobile receiving station, so it may take time and effort to go to a moving route of transportation.

The disclosure provides a technique for improving the efficiency of package delivery operation and the efficiency of package pickup operation.

A first aspect of the disclosure provides a package delivery support system including: a mobile unit prepared in an area; and a management device configured to manage the mobile unit, the management device including circuitry configured to acquire at least one of a delivery request to deliver a package loaded on the mobile unit and a pickup request to pick up a package with the mobile unit, and supply the mobile unit with an instruction for causing the mobile unit to move to a location specified by the at least one of the delivery request and the pickup request.

According to the first aspect, the mobile unit moves to the location specified by the at least one of the delivery request and the pickup request, so it is possible to load a package onto the mobile unit at that location or collect a package from the mobile unit at that location. Therefore, a person who delivers a package completes his or her work just by loading the package onto the mobile unit at the specified location, so it is possible to save time and effort to revisit a delivery destination of the package (such as the home of a recipient of the package). In addition, since it is possible to provide an instruction to cause the mobile unit to move to a location specified for delivery (recipient's home), the recipient is allowed to save time and effort to go to a place different from the home to take a package or time and effort to take a package home. With this configuration, it is possible to improve the efficiency of delivery. For pickup of a package as well, since it is possible to call the mobile unit to a specified location, such as the home, time and effort for a client to deliver a package are saved, and, in addition, since the mobile unit visits client's home, or the like, in place of a delivery company, time and effort of the delivery company are reduced. With this configuration as well, it is possible to improve the efficiency.

In the first aspect, the circuitry may be configured to determine whether at least one of delivery and pickup of the package with the mobile unit is available based on whether the location specified as a delivery destination of the package is in the area.

With the above configuration, a method in which the delivery company goes to a specified location or a method in which the mobile unit goes to a specified location is selectable as a package delivery method.

In the first aspect, the circuitry may be configured to, when a plurality of candidates for the mobile unit is present in the area, select the mobile unit from among the candidates based on location information of each of the candidates and the specified location.

With the above configuration, the candidate that relatively easily moves to the specified location is selected as the mobile unit, so it is possible to shorten a time required for delivery or pickup and improve the efficiency of work.

In the first aspect, the circuitry may be configured to supply an instruction to the mobile unit such that the mobile unit travels in the area.

With the above configuration, the mobile unit that is used as a storage space for a package travels in the area, so each user who is in the area and uses the mobile unit is allowed to use the mobile unit near his or her specified location. As a result, it is possible to shorten a time required for delivery or pickup and improve the efficiency of work.

In the first aspect, the mobile unit may have a lockable and unlockable loading space for loading the package; and the circuitry may be configured to transmit information for unlocking the locked loading space to a terminal of a person who performs at least one of delivery and pickup of the package.

With the above configuration, even without a mechanical key for the loading space of the mobile unit, a delivery person or a pickup person is allowed to unlock the locked loading space. Since the loading space is locked, it is possible to ensure the security of a package.

A second aspect of the disclosure provides a mobile unit prepared in an area, the mobile unit including: circuitry configured to acquire an instruction to move to a location specified by at least one of a delivery request to deliver a package loaded on the mobile unit and a pickup request to pick up a package with the mobile unit, and control movement of the mobile unit to the specified location based on the instruction.

In the second aspect, the mobile unit may have a lockable and unlockable loading space for loading the package.

A third aspect of the disclosure provides a non-transitory computer-readable storage medium storing a program, the program being executable on a computer of a management device configured to manage a mobile unit prepared in an area, the program, when executed on the computer, causing the computer to execute operations including: acquiring at least one of a delivery request to deliver a package loaded on the mobile unit and a pickup request to pick up a package with the mobile unit; and supplying the mobile unit with an instruction for causing the mobile unit to move to a location specified by the at least one of the delivery request and the pickup request.

A fourth aspect of the disclosure provides a package delivery support method including: acquiring, by a management device for a mobile unit prepared in an area, at least one of a delivery request to deliver a package loaded on the mobile unit and a pickup request to pick up a package with the mobile unit; and supplying, by the management device, the mobile unit with an instruction for causing the mobile unit to move to a location specified by the at least one of the delivery request and the pickup request.

A fifth aspect of the disclosure provides a non-transitory computer-readable storage medium storing a program, the program being executable on a computer of a mobile unit prepared in an area, the program, when executed on the computer, causing the computer to execute operations including: acquiring an instruction to move to a location specified by at least one of a delivery request to deliver a package loaded on the mobile unit and a pickup request to pick up a package with the mobile unit; and executing a process for moving to the specified location based on the instruction.

A sixth aspect of the disclosure provides a package delivery support method including: acquiring, by a mobile unit prepared in an area, an instruction for causing the mobile unit to move to a location specified by at least one of a delivery request to deliver a package loaded on the mobile unit and a pickup request to pick up a package with the mobile unit; and causing the mobile unit to move to the specified location based on the instruction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 shows an example of the data structure of a mobile unit management information table;

FIG. 4 shows an example of the data structure of an address-area correspondence table;

FIG. 5 shows an example of the data structure of a delivery information table;

FIG. 6 shows an example of the data structure of a user information table;

FIG. 18 is a sequence diagram that shows a third operation example.

DETAILED DESCRIPTION OF EMBODIMENTS

Hereinafter, a package delivery support system, a package delivery support method, a non-transitory computer-readable storage medium including a program recorded on the storage medium, and a mobile unit according to an embodiment of the disclosure will be described with reference to the accompanying drawings. The configuration of the embodiment is illustrative. The disclosure is not limited to the configuration of the embodiment.

Outline of Delivery Support System

Figure 1:
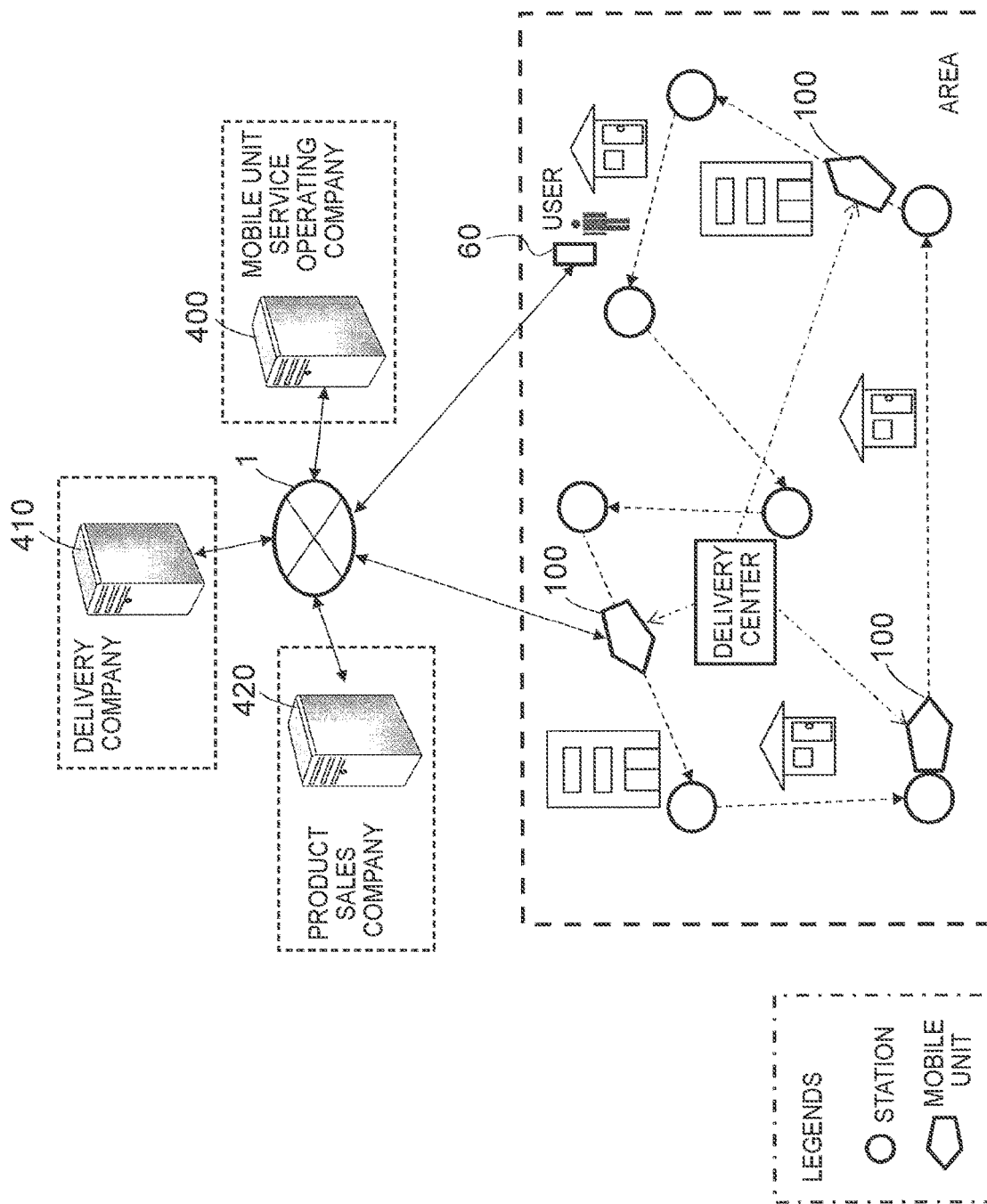
FIG. 1 is a schematic configuration diagram of a delivery support system according to an embodiment.

FIG. 1 is a schematic diagram of the delivery support system according to the embodiment. As shown in FIG. 1, the delivery support system includes a mobile unit management server 400 (also referred to as management server 400), a delivery server 410, a sales server 420, a user terminal 60, and mobile units 100. The management server 400, the delivery server 410, the sales server 420, the user terminal 60, and the mobile units 100 are communicably connected to a network 1. The management server 400 may be regarded as a management device for a mobile unit.

The network 1 is a public communication network, such as the Internet. A wide area network (WAN) or another communication network may be employed as the network 1. The network 1 may include a cellular network, such as long term evolution (LTE), and a wireless network, such as a wireless local area network (LAN) including Wi-Fi.

The sales server 420 is managed by a sales company of products. The sales server 420 executes a process of providing a user with information of a website regarding online shopping (referred to as online shopping site) that the sales company operates (such as a webpage that contains information about products available for purchase). For example, the sales server 420 executes a process regarding the operation of the online shopping site. For example, the sales server 420 provides information of a webpage containing information about products available for purchase to the user terminal 60 that has accessed the online shopping site, and exchanges information regarding purchases and sales of products with the user terminal 60.

The delivery server 410 is managed by a home-delivery company (also referred to as delivery company) that delivers a package to a delivery destination specified by a consignor (including the sales company of the above product, and the user) for delivery of the package on consignment from the consignor. The delivery server 410 manages information regarding a package on consignment (the content of the package, a destination of the package (address, phone number, and the like), specified delivery time, and the like), and information indicating the location of the package.

The management server 400 is managed by a mobile unit management company that manages the operations of the mobile units 100 that support delivery and pickup of packages. The management server 400 manages information regarding the mobile units 100. Examples of the information include information indicating the current location of each mobile unit 100, information indicating the status of each mobile unit 100, information indicating an operation schedule, and a loaded package. The management server 400 is able to provide information regarding the mobile units 100 to a request source in response to a request from the sales server 420, the delivery server 410, the user terminal 60, or the like. The management server 400 causes each mobile unit 100 to move to a corresponding predetermined location in accordance with the operation schedule by providing an instruction to the mobile unit 100.

The mobile unit management company manages the operations of at least one mobile unit 100 prepared in each area. The areas may be administrative sections, or may be geographical ranges set by the mobile unit management company as needed. An area division method is selectable as needed. The size of each area is determined based on a residential distribution, or the like. For example, a populated area may be small, and a depopulated area may be large. However, the size of each area may be set based on another criterion.

Each mobile unit 100 travels in the corresponding area. Each mobile unit 100 has a storage or loading space for storing or loading a package. Each mobile unit 100 stores a package transferred from a delivery company and delivers the package to a user's location, or stores a package picked up from a user. Each mobile unit 100 is managed so as to be shared among a plurality of users in the corresponding area. A traveling route of each mobile unit 100 may be set as needed. At least one station (stop of the mobile unit 100) is provided in the area. Each mobile unit 100 departs from a predetermined station that is a starting point, travels in the area along a predetermined route, and returns to the original station. When there are a plurality of (two or more) stations in the area, the mobile unit 100 departs from the initial station, passes through the other station(s) in a predetermined order, and returns to the initial station. Each mobile unit 100 may go along a different route for each round trip. The station that is the starting point from which the mobile unit 100 moves in traveling and the station that is the end point to which the mobile unit 100 moves in traveling are not necessarily the same. Each of the plurality of mobile units 100 may travel along the same route or may travel along a different route. FIG. 1 shows an example in which the plurality of mobile units 100 move in the same direction (counterclockwise direction) along the same traveling route connecting a plurality of stations with a time difference.

As an example, the mobile unit 100 stops at each station for a predetermined time and then starts moving toward the next station. Energy is supplied to the mobile unit 100 at at least one station. For example, when the mobile unit 100 is electrically driven, a secondary battery of the mobile unit 100 is charged at the station. The station may be any location as long as there is a space for stopping the mobile unit 100 for a predetermined time. The station may be a parking lot of a convenience store, a vehicle dealer, a vehicle repair shop, or the like.

The mobile unit 100, for example, starts moving toward the next station when it is time to start moving at each station. When a delivery request to deliver a package stored in the mobile unit 100 is issued while the mobile unit 100 is moving, the mobile unit 100 moves to a transfer location (package receiving location) specified by the delivery request, and stops. A recipient of the package takes out the package from the package storage space of the mobile unit 100 stopped at the transfer location. Thus, the recipient performs a transfer (receipt) of the package. When a pickup request to pick up a package is issued while the mobile unit 100 is moving, the mobile unit 100 moves to a pickup location (transfer location) specified by the pickup request, and stops. A sender (delivery client) of a package stores the package into the package storage space of the stopped mobile unit 100. Thus, the sender performs a transfer (pickup) of the package. Completion of the above-described transfer of the package triggers the mobile unit 100 to start moving toward the original route (the next station). In this way, each mobile unit 100 travels along the traveling route a predetermined number of times for a predetermined time (for example, a day). The length of the predetermined time and the number of laps within the predetermined time may be set as needed.

While the mobile unit 100 is stopped at a station, a transfer (receipt or pickup) of a package is allowed to be performed. A recipient or a pickup client goes to the station at which the mobile unit 100 is stopped, and then takes out a package from the storage space or loads a package for delivery into the storage space. Thus, a transfer of the package is performed. When the mobile unit 100 has received a transfer request or a pickup request while the mobile unit 100 is stopped, the mobile unit 100 starts moving toward a transfer location at time to start moving. However, when the mobile unit 100 has received a transfer request or a pickup request while the mobile unit 100 is stopped, the mobile unit 100 may start moving before time to start moving.

The mobile unit 100 may also be configured to be on standby at a station and start moving toward the next station upon receipt of a delivery request or a pickup request as a trigger to start moving. In this case, for example, the mobile unit 100 starts moving toward the next station via a location specified by the delivery request or the pickup request. The management server 400 may also be configured to supply the mobile unit 100 with an instruction to move to a specified location (a station, a delivery location, a pickup location, or the like) and, when the mobile unit 100 arrives at the specified location, provide an instruction to move to a next specified location.

System Configuration

Figure 2:
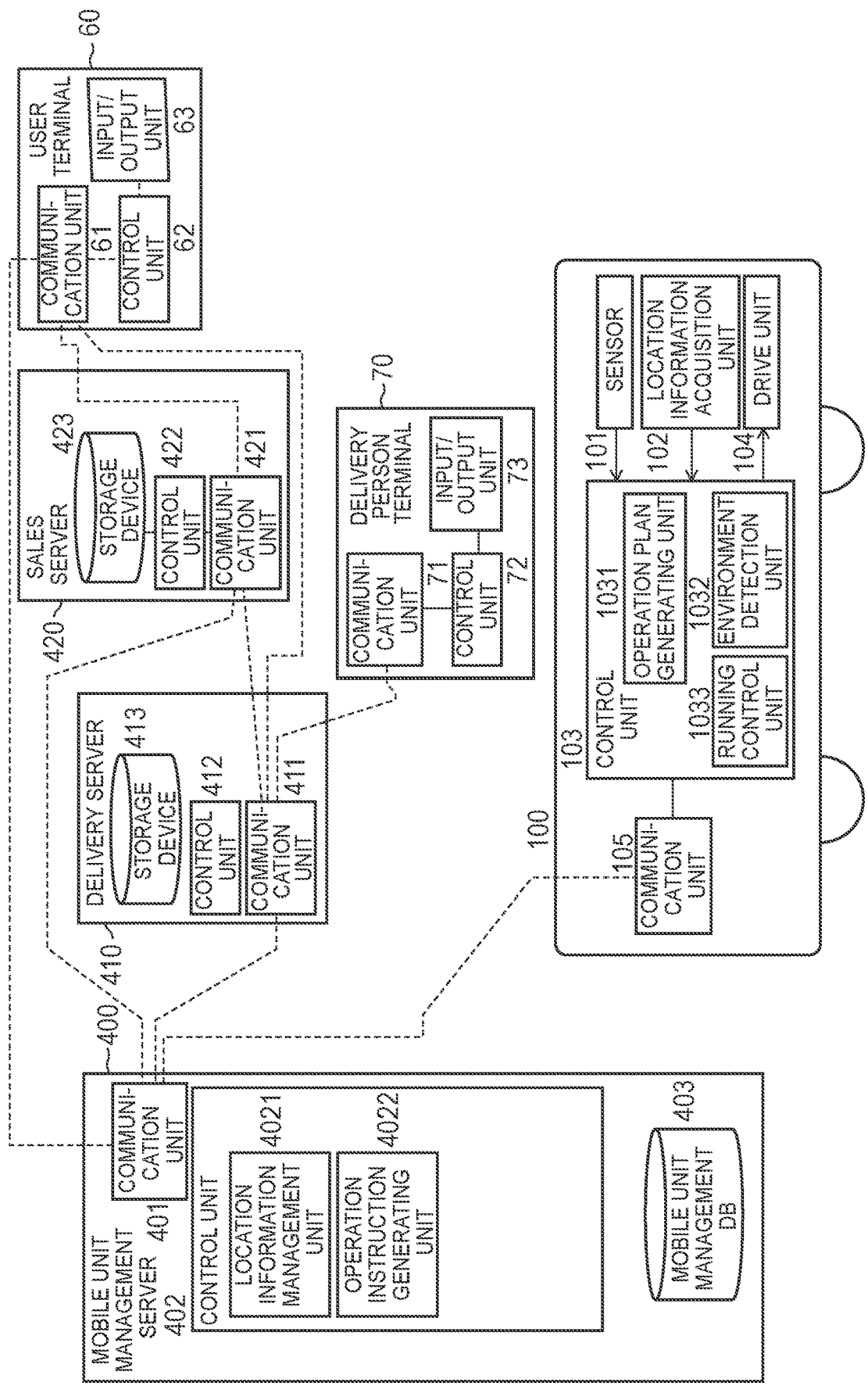
FIG. 2 shows an external configuration diagram of a mobile unit that travels in an area.

FIG. 2 is a configuration diagram that schematically illustrates the configuration of each of the management server 400, the delivery server 410, the sales server 420, the user terminal 60, and a terminal 70 of a delivery company (also referred to as delivery person terminal 70). The hardware configuration and functional configuration of each of the management server 400, the delivery server 410, the sales server 420, the user terminal 60, and the terminal 70 of the delivery company will be described with reference to FIG. 2.

Mobile Unit

Each mobile unit 100 is an autonomous vehicle that autonomously runs based on a supplied instruction. Each mobile unit 100 may be a ship or an aircraft (such as a plane, a helicopter, and a drone) as long as the mobile unit 100 is able to travel or perform delivery and pickup in a corresponding area. In the present embodiment, each mobile unit 100 is a vehicle that autonomously runs on a road. Each mobile unit 100 is able to leave a traveling course and move to a package receipt location or package pickup location specified by the user in response to a user's request. The package receipt location or the package pickup location is specified by the user; however, a route to the location may be specified by the user or may be determined as needed by the mobile unit 100, the management server 400, or the like.

Each mobile unit 100 does not always need to be unattended, and autonomous running is not indispensable. For example, a personnel that provides a package transfer or pickup service to the user, a security personnel (that performs charging work, or the like, at a station), or the like, may be aboard each mobile unit 100. Each mobile unit 100 does not always need to constantly autonomously move. For example, movement of the mobile unit 100 may be maneuvered by a human. Each mobile unit 100 may be maneuvered by a person getting on the mobile unit 100 or may be operated by remote control with a remote controller, or the like.

Each mobile unit 100 runs in accordance with an operation instruction acquired from the management server 400. Specifically, each mobile unit 100 generates a running path based on the operation instruction acquired via wireless communication, and runs on a road with an appropriate method as autonomous running while sensing the surroundings of the mobile unit 100. Each mobile unit 100 includes a sensor 101, a location information acquisition unit 102, a control unit 103, a drive unit 104, and a communication unit 105. A battery (secondary battery) (not shown) is mounted on the mobile unit 100. The mobile unit 100 operates on electric power that is supplied from the secondary battery.

The sensor 101 senses the surroundings of the mobile unit 100 in order to acquire information required for the mobile unit 100 to autonomously run. Examples of the sensor 101 include a stereo camera, a laser scanner, LIDAR, and radar. The information acquired by the sensor 101 is transmitted to the control unit 103, and is used by the control unit 103 in order to, for example, recognize an obstacle around the mobile unit 100 or a traffic lane. In the present embodiment, the sensor 101 includes a visible light camera for monitoring. The location information acquisition unit 102 acquires the current location of the mobile unit 100. For example, the location information acquisition unit 102 includes a global positioning system (GPS) receiver, or the like. The information acquired by the location information acquisition unit 102 is also transmitted to the control unit 103, and is used in a predetermined process, such as calculating a route for the mobile unit 100 to reach a destination by using the current location of the mobile unit 100 or calculating a required time required to reach the destination.

The control unit 103 is a computer that controls the mobile unit 100 based on information acquired from the sensor 101 and the location information acquisition unit 102. The control unit 103 includes, for example, a central processing unit (CPU), a memory, and an auxiliary storage device (such as a hard disk) (all of which are not shown). The CPU loads programs stored in the auxiliary storage device onto the memory and executes the programs. Thus, functions for executing the above-described various processes are implemented. As specific examples of the various processes, the control unit 103 operates as an operation plan generating unit 1031, an environment detection unit 1032, and a running control unit 1033.

The operation plan generating unit 1031 acquires an operation instruction from the management server 400, and generates its own operation plan. The operation instruction contains information about a departure place and a destination. The information is supplied to the mobile unit 100. Therefore, the operation plan generating unit 1031 calculates a moving route of the mobile unit 100 based on the destination supplied from the management server 400 and the location of the host vehicle, obtained by the location information acquisition unit 102, and generates an operation plan for moving along the moving route. The operation plan contains data regarding the thus calculated path along which the mobile unit 100 runs, and data that defines processes that the mobile unit 100 should execute in part or whole of the path. Examples of data contained in the operation plan include the following (1) and (2).

(1) Data that Represents a Path Along which the Host Vehicle Runs by a Collection of Road Links The path along which the host vehicle runs may be, for example, automatically generated based on the supplied departure place and destination by consulting stored map data. Calculation of a route along which the host vehicle runs may be not dependent on a process that is executed in the mobile unit 100 but may be dependent on a process that is executed on an external device (for example, the management server 400). In this case, the management server 400 may acquire the host vehicle location from the mobile unit 100, may calculate a path along which the mobile unit 100 should travel, and may incorporate the calculated path data into the operation instruction, or may transmit the calculated path data to the mobile unit 100 separately from the above-described operation instruction.

(2) Data that Represents a Process that the Host Vehicle should Execute at a Point on a Path Examples of the process that the mobile unit 100 executes include "unlocking or locking a cover of the package storage space" and "opening or closing the cover" under a predetermined condition; however, the process is not limited to these processes. The operation plan generated by the operation plan generating unit 1031 is transmitted to the running control unit 1033 (described later).

The environment detection unit 1032 detects an environment around the mobile unit 100, which is required for autonomous running, based on data acquired by the sensor 101. Examples of objects to be detected include the number of lanes, the position of a lane, the number and locations of other mobile units around the mobile unit 100, the number and locations of obstacles (for example, pedestrians, bicycles, structures, or the like) around the mobile unit 100, the structure of a road, and a road sign; however, the objects to be detected are not limited to these objects. The objects to be detected may include any object as long as the object is required for the mobile unit 100 to autonomously run. For example, when the sensor 101 is a stereo camera, an object around the mobile unit 100 is detected by executing image processing on image data captured by the stereo camera. The environment detection unit 1032 may not only simply detect an object around the mobile unit 100 but also track the detected object (continue detecting the detected object). For example, a relative velocity of an object is obtained from a difference between coordinates of the object, detected one step before, and current coordinates of the object. Data regarding an environment around the mobile unit 100 (hereinafter, environment data), detected by the environment detection unit 1032, is transmitted to the running control unit 1033 (described later).

The running control unit 1033 generates a control instruction for causing the mobile unit 100 to autonomously run based on the operation plan generated by the operation plan generating unit 1031, the environment data generated by the environment detection unit 1032, and the location information of the mobile unit 100, acquired by the location information acquisition unit 102. For example, the running control unit 1033 generates a control instruction such that the mobile unit 100 runs along a predetermined path and no obstacle enters a predetermined safe area around the mobile unit 100. The generated control instruction is transmitted to the drive unit 104 (described later). A known method may be employed as a method of generating a control instruction for causing the mobile unit 100 to autonomously move.

The drive unit 104 is a unit that causes the mobile unit 100 to run based on the control instruction generated by the running control unit 1033. The drive unit 104 includes, for example, a motor and an inverter for driving wheels of the mobile unit 100, a brake, a steering mechanism, and the like. When the motor, the brake, and the like, are driven in accordance with the control instruction, autonomous running of the mobile unit 100 is achieved. The communication unit 105 connects the mobile unit 100 to the network 1. A network interface card (NIC) (not shown), or the like, is applied as the communication unit 105. In the present embodiment, the communication unit 105 is able to carry out communication with another device (such as the management server 400) via the network 1 with the use of a mobile unit communication service, such as 3rd generation (3G) and long term evolution (LTE).

Mobile Unit Management Server

Next, the management server 400 will be described. The management server 400 is a device that manages autonomous running of the plurality of mobile units 100 and that transmits an operation instruction. For example, when the management server 400 has received a package delivery request or a package pickup request, the management server 400 acquires a delivery location or a pickup location (specified location), and then transmits an operation instruction to the mobile unit 100 that is running near the specified location. The management server 400 is also a device that provides information regarding the mobile units 100 to the delivery company (delivery server 410) or the sales company (sales server 420).

The management server 400 has a general computer configuration. Specifically, the management server 400 includes a processor (not shown), such as a CPU and a digital signal processor (DSP), a memory (not shown), such as a random access memory (RAM) and a read only memory (ROM), and an auxiliary storage device (not shown), such as an erasable programmable ROM (EPROM), a hard disk drive (HDD), and removable media. Examples of the removable media include a universal serial bus (USB) memory and a disk recording medium, such as a compact disc (CD) and a digital versatile disc (DVD). The auxiliary storage device stores an operating system (OS), various programs, various tables, and the like. The processor loads the programs stored in the auxiliary storage device onto a working area of the memory, and executes the loaded programs. When various processes and operations are performed by executing the programs, functions that agree to a predetermined purpose are implemented.

The management server 400 includes a communication unit 401. The communication unit 401 establishes a connection with another device via the network 1, and carries out communication between each mobile unit 100 and the management server 400, or the like. The communication unit 401 is, for example, an NIC or a wireless communication circuit for wireless communication. The NIC or the wireless communication circuit is connected to the network 1.

The management server 400 further includes a mobile unit management DB 403 in the auxiliary storage device. The mobile unit management DB 403 stores various pieces of information regarding the plurality of mobile units 100 that autonomously run. This database (DB) is constructed as follows. A program of a database management system (DBMS), which is executed by the processor, manages data stored in the auxiliary storage device. The mobile unit management DB 403 is, for example, a relational database.

The configuration of mobile unit management information that is stored in the mobile unit management DB 403 will be described with reference to FIG. 3. FIG. 3 shows an example of the data structure of a mobile unit management information table T1. The table T1 has records (entries) respectively provided for mobile unit IDs. Each record includes fields, that is, area ID, the current location of the mobile unit 100, the status of the mobile unit 100, the operation schedule of the mobile unit 100, loaded package, and package information, corresponding to the mobile unit ID.

The area ID that is the identifier of an area in which the mobile unit 100 corresponding to the mobile unit ID is prepared is stored in the area ID field. Of course, the table T1 may be generated for each area, and the area ID may be used as an index of the table. The current location of the mobile unit 100, acquired by the mobile unit 100, is stored in the current location field. For example, each time information related to a latitude and a longitude for determining the current location of the mobile unit 100 and acquired by the location information acquisition unit 102 of the mobile unit 100 is transmitted from the mobile unit 100 to the management server 400, the current location field corresponding to the mobile unit 100 in the mobile unit management DB 403 is updated. Of course, the current location may be acquired from a device other than the mobile unit 100.

The status indicates the current status of the mobile unit 100. Examples of the status include "stopped" at a station, "delivering" that means moving to a delivery location or being stopped at a delivery location, "moving" to the next destination (such as a station other than a delivery location or a pickup location), and "picking up" that means moving to a pickup location or being stopped at a pickup location. The status may further include a state other than these states ("checking" or "resting (non-operated state)"). The status is not limited to these states.

The operation schedule indicates the operation schedule of the mobile unit 100. Operation schedule information is indicated by, for example, a stoppage time period at each station, and a time period expended to move between stations. The next destination (a station, a delivery location, or a pickup location) is also included in the information that indicates the operation schedule. In the present embodiment, the management server 400 provides an instruction to the mobile unit 100 such that the mobile unit 100 moves to the next destination (station) or moves to the next destination (station) via at least one of a delivery location and a pickup location. When a stoppage time at the next station is determined in the operation schedule, the mobile unit 100 is instructed to stop at the next station for the stoppage time.

A loaded package indicates whether a package is loaded on the mobile unit 100. Information regarding delivery of a package, such as a package ID that is the identifier of a package, a delivery management number (delivery ID), the content of the package, and delivery time, is stored as package information.

As shown in FIG. 4, an address-area correspondence table T2 (hereinafter, table T2) is stored in the auxiliary storage device. The table T2 stores a correspondence relation between an address or residence and an area ID, and is used to determine an area corresponding to an address or residence.

In the management server 400, when the above-described processor executes a program, a control unit 402 is implemented as a functional unit. The control unit 402, for example, executes a process related to autonomous running of the mobile units 100 as described above, and exchanges data with the delivery server 410, the sales server 420, the user terminal 60, and the like. More specifically, the control unit 402 operates as a location information management unit 4021, an operation instruction generating unit 4022, and the like, as functional units. Of these, the location information management unit 4021 and the operation instruction generating unit 4022 execute a process regarding autonomous running of the mobile units 100.

The location information management unit 4021 and the operation instruction generating unit 4022 will be described. The location information management unit 4021 collects location information from the plurality of mobile units 100 managed by the management server 400, and manages the plurality of mobile units 100. Specifically, the location information management unit 4021 receives current location information from the plurality of mobile units 100 at a point in time at predetermined intervals, and stores the current location information in the mobile unit management DB 403.

Upon receipt of a delivery request or a pickup request, the operation instruction generating unit 4022 determines the mobile unit 100 that is used for delivery or pickup, and generates an operation instruction appropriate for a delivery location contained in the delivery request or a pickup location contained in the pickup request. The operation instruction contains a delivery location or pickup location as a destination, and contains information that indicates a path to the destination. The operation instruction may indicate that the mobile unit 100 moves to the next station as a destination by way of a delivery location or a pickup location. In this case, an operation instruction is generated on the assumption that the mobile unit 100 stops at a delivery location or a pickup location for a predetermined time.

The control unit 402 is configured to acquire at least one of a delivery request to deliver a package and a pickup request to pick up a package, and is configured to supply the mobile unit 100 with an instruction for causing the mobile unit 100 to move to a location specified by the at least one of these requests. The control unit 402 is configured to determine whether at least one of delivery and pickup of a package with the use of the mobile unit 100 is available, and is configured to select the mobile unit 100 from among a plurality of candidates in an area. The control unit 402 is configured to transmit information for unlocking a locked loading space to a terminal (the user terminal 60 or the delivery person terminal 70) of a person who performs at least one of delivery and pickup of a package.

Delivery Server

Next, the delivery server 410 will be described. The delivery server 410 has a general computer configuration. The delivery server 410, as well as the management server 400, is a computer that includes a processor (not shown), such as a CPU and a DSP, and a storage device 413 (including a RAM, a ROM, an EPROM, a hard disk drive, removable media, and the like). An operating system, various programs, various tables, and the like, are stored in the storage device 413. The processor loads the programs stored in the storage device 413 onto a working area within the storage device 413, and executes the loaded programs. The processor operates as a control unit 412 by executing the programs, and implements functions that agree to a predetermined purpose.

The delivery server 410 includes a communication unit 411. The communication unit 411, as well as the communication unit 401 of the management server 400, establishes a connection with other devices (for example, the management server 400, the sales server 420, the user terminal 60, and the delivery person terminal 70), and carries out communication between the delivery server 410 and the other devices. The communication unit 411 is, for example, an NIC or a wireless communication circuit for wireless communication. The NIC or the wireless communication circuit is connected to the network 1.

FIG. 5 shows an example of the data structure of a delivery information table T3 stored in the storage device 413. The table T3 is able to store information items, such as an area ID, package information, a delivery time period, whether a mobile unit is available, a mobile unit ID, a current location, and a transfer location, corresponding to a delivery ID (such as a delivery management number). The area ID is the identifier of an area in which a delivery destination is located. The package information is similar information to the package information stored in the table T1. The delivery time period indicates a time period for delivery, desired by a user. Instead of a delivery time period, or in addition to a delivery time period, a desired delivery date may be stored. Whether a mobile unit is available indicates whether the mobile unit 100 is available for receipt of a package. The mobile unit ID indicates the identifier of a mobile unit that is used to receive a package. The current location is the current location of the mobile unit 100. The transfer location indicates a transfer location of a package loaded on the mobile unit 100, and becomes a destination of the mobile unit 100.

Sales Server

Next, the sales server 420 will be described. The sales server 420 has a general computer configuration. The sales server 420, as well as the delivery server 410, is a computer that includes a processor (not shown), such as a CPU and a DSP, and a storage device 423 (including a RAM, a ROM, an EPROM, a hard disk drive, removable media, and the like). An operating system, various programs, various tables, and the like, are stored in the storage device 423. The processor loads the programs stored in the storage device 423 onto a working area within the storage device 423, and executes the loaded programs. The processor operates as a control unit 422 by executing the programs, and implements functions that agree to a predetermined purpose.

The sales server 420 includes a communication unit 421. The communication unit 421, as well as the communication unit 401 of the management server 400, establishes a connection with other devices (for example, the management server 400, the delivery server 410, and the user terminal 60), and carries out communication between the sales server 420 and the other devices. The communication unit 421 is, for example, an NIC or a wireless communication circuit for wireless communication. The NIC or the wireless communication circuit is connected to the network 1.

Information of a product page to be read by a user on a shopping site and user information are stored in the storage device 423. FIG. 6 shows an example of the data structure of a user information table T4. A record for each user ID that is the identifier of a user is stored in the table T4. Each record contains information items, such as the name of a user, the address or residence of the user, the phone number of the user, the mail address of the user, delivery destination information, and terminal information. The delivery destination information indicates the address or residence of a package delivery destination, different from the address or residence of the user. The terminal information indicates an address that is used to transmit data to the user terminal 60. The address is, for example, an internet protocol (IP) address or a media access control (MAC) address.

User Terminal

The user terminal 60 is used by a user. The user terminal 60 may be a mobile terminal, such as a smart device, that is, a smart phone and a tablet, a personal computer, a work station, or an in-vehicle terminal. The user terminal 60 includes a communication unit 61, a control unit 62, and an input/output unit 63. A device of the same type as the device that is used to constitute the communication unit 401 and control unit 402 of the management server 400 is applicable as the communication unit 61 and the control unit 62. The input/output unit 63 includes an input device and an output device. Examples of the input device include a button, a key, a pointing device, a touch panel, and a microphone. Examples of the output device include a display and a speaker.

Delivery Person Terminal

The delivery person terminal 70 is a terminal device that a delivery company (such as a person in charge of delivery or pickup) for delivering or picking up a package uses. A similar terminal to the user terminal 60 may be used. The delivery person terminal 70 includes a communication unit 71, a control unit 72, and an input/output unit 73. Devices similar to the communication unit 61, the control unit 62, and the input/output unit 63 are applicable to the communication unit 71, the control unit 72, and the input/output unit 73.

Any functional components of the mobile unit management server 400, the delivery server 410, and the sales server 420 or part of the processes that are executed on the mobile unit management server 400, the delivery server 410, and the sales server 420 may be executed by another computer connected to the network 1. A series of processes that are executed on the mobile unit management server 400, the delivery server 410, and the sales server 420 may be executed by hardware or may be executed by software. This also applies to the user terminal 60 and the delivery person terminal 70.

Operation Examples

Hereinafter, operation examples of the system for user's purchase of products and delivery of products will be described.

First Operation Example

Figure 7:
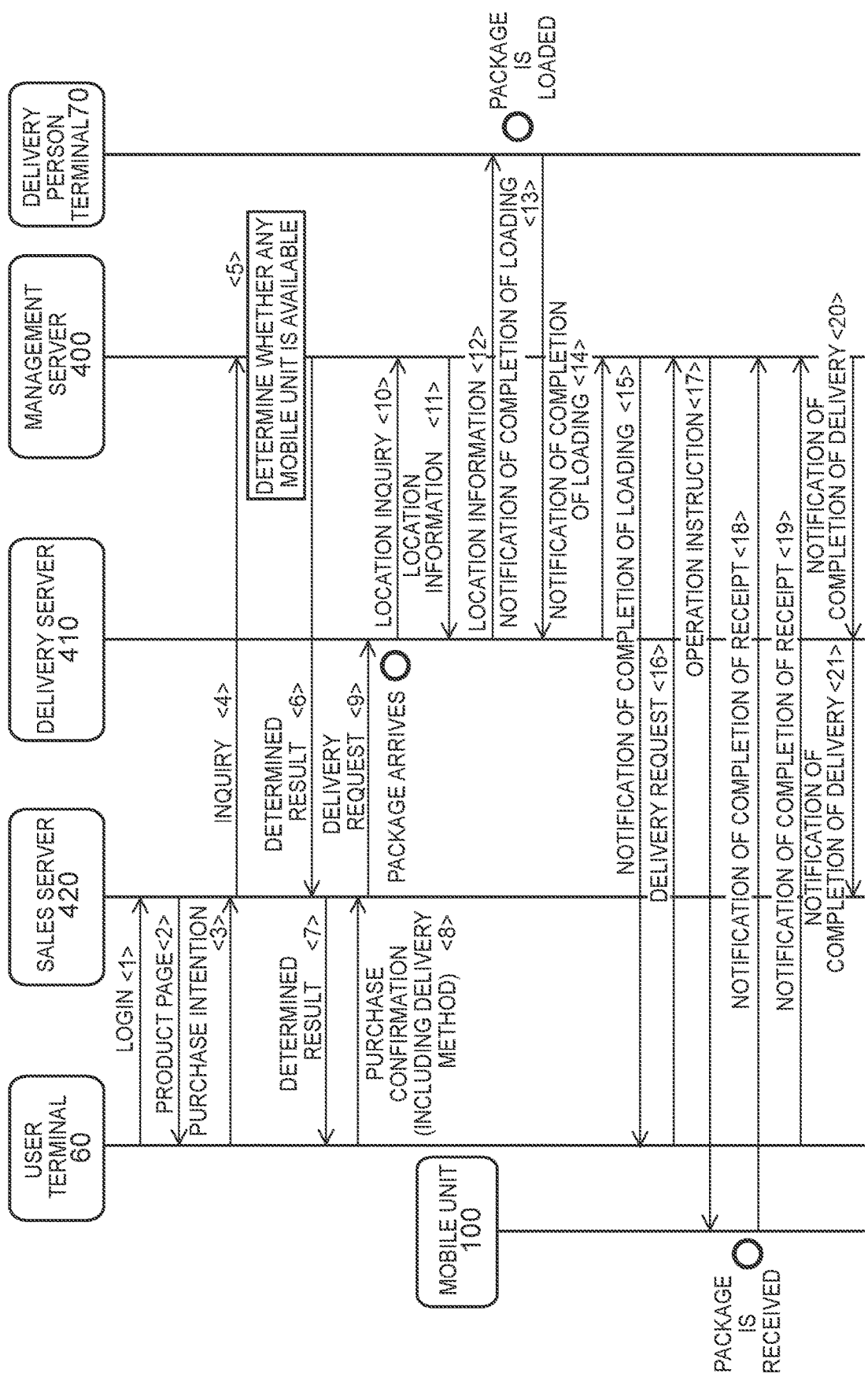
FIG. 7 is a sequence diagram that shows a first operation example.
Figure 8:
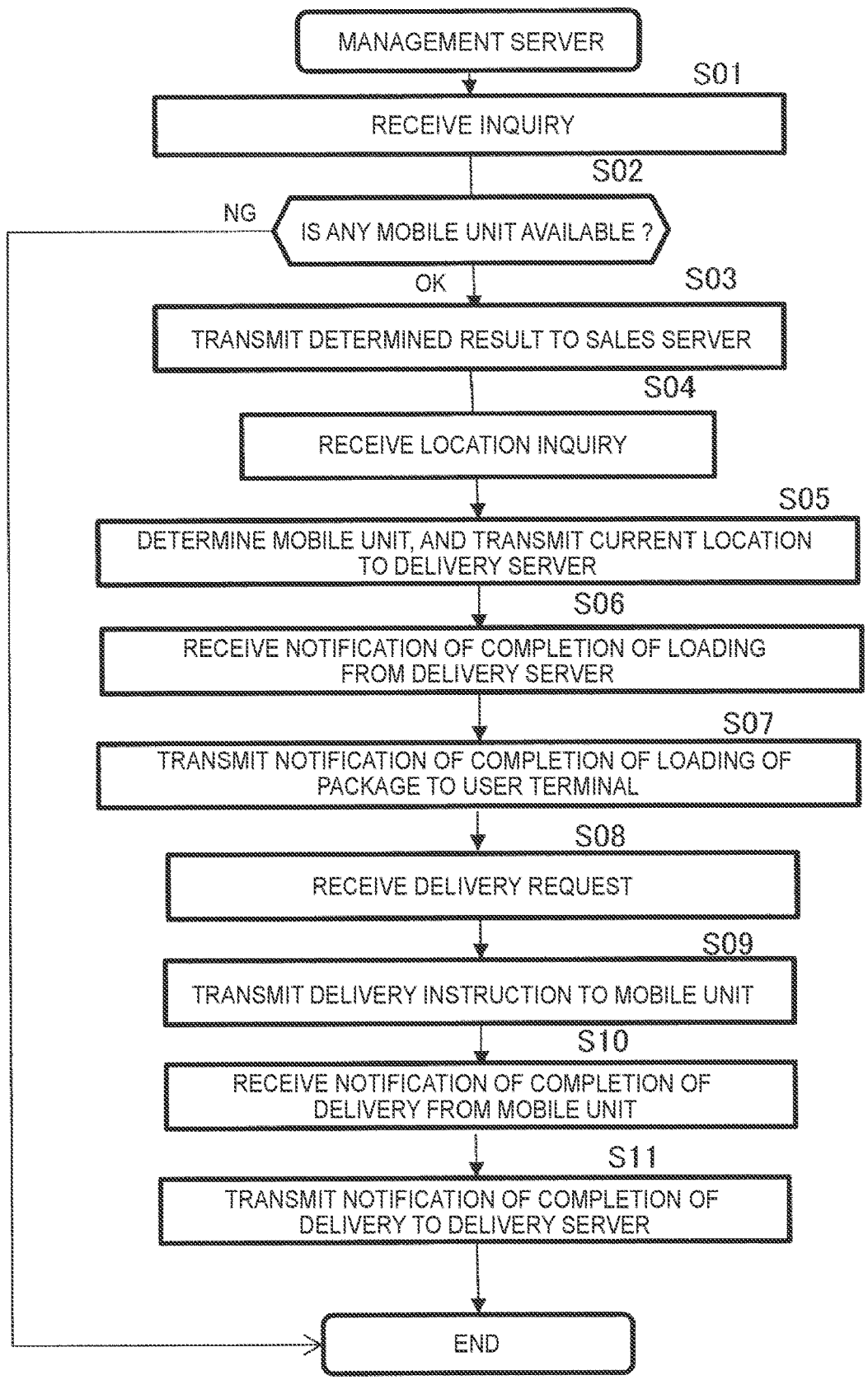
FIG. 8 is a flowchart that shows an example of a process that is executed by a control unit of a management server in the first operation example.
Figure 9:
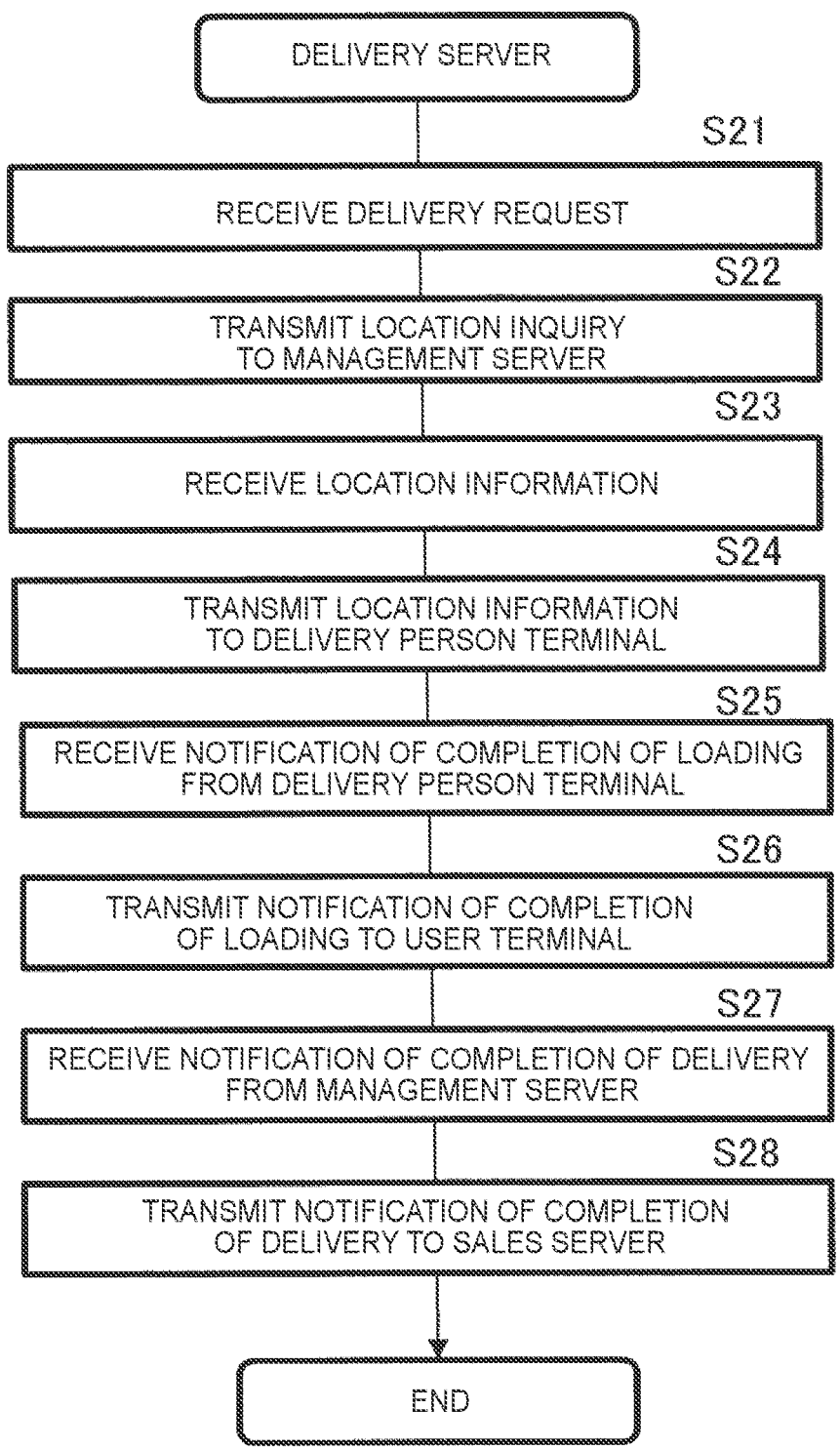
FIG. 9 is a flowchart that shows an example of a process that is executed by a control unit of a delivery server in the first operation example.
Figure 10:
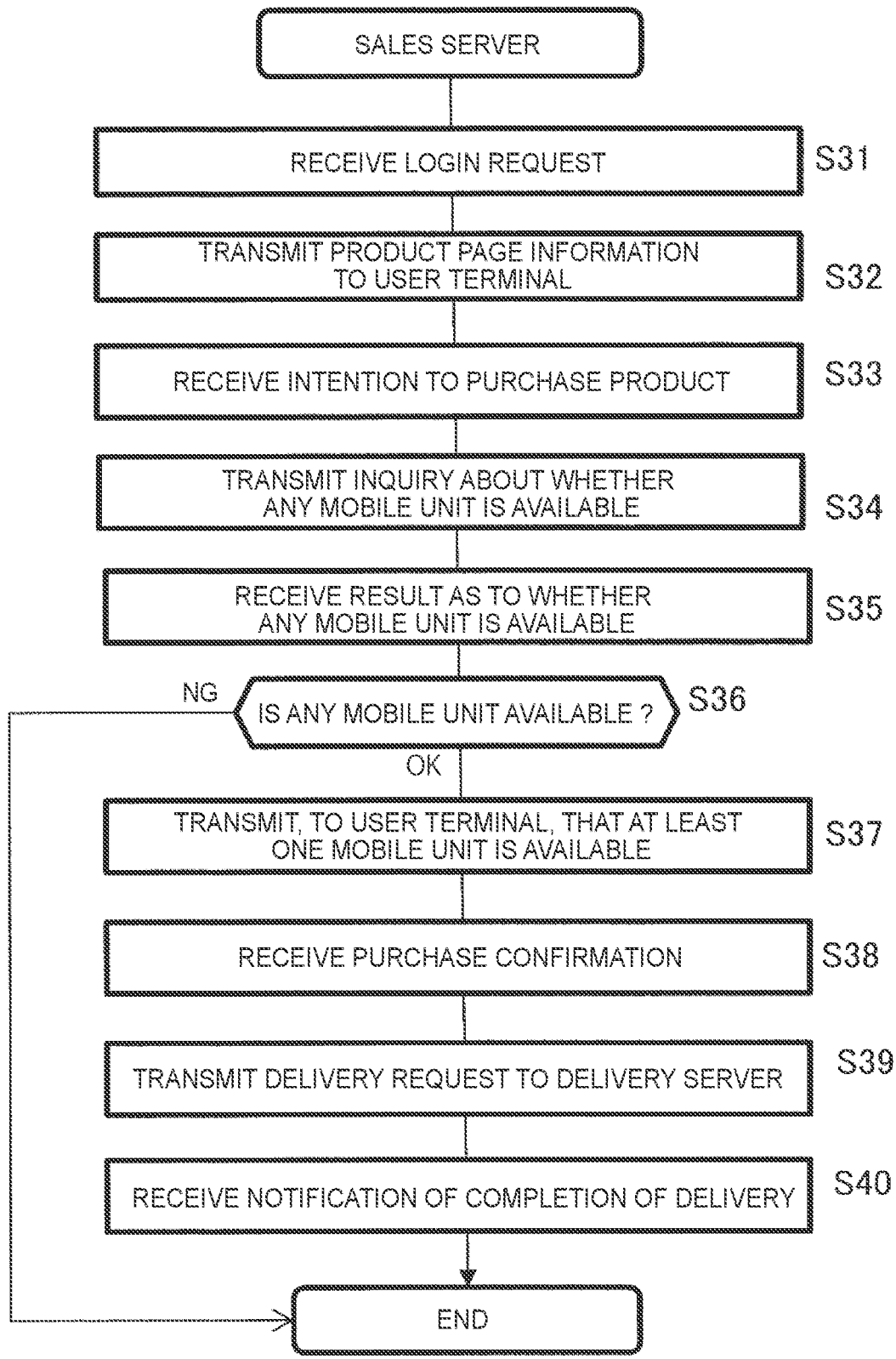
FIG. 10 is a flowchart that shows an example of a process that is executed by a control unit of a sales server in the first operation example.
Figure 11:
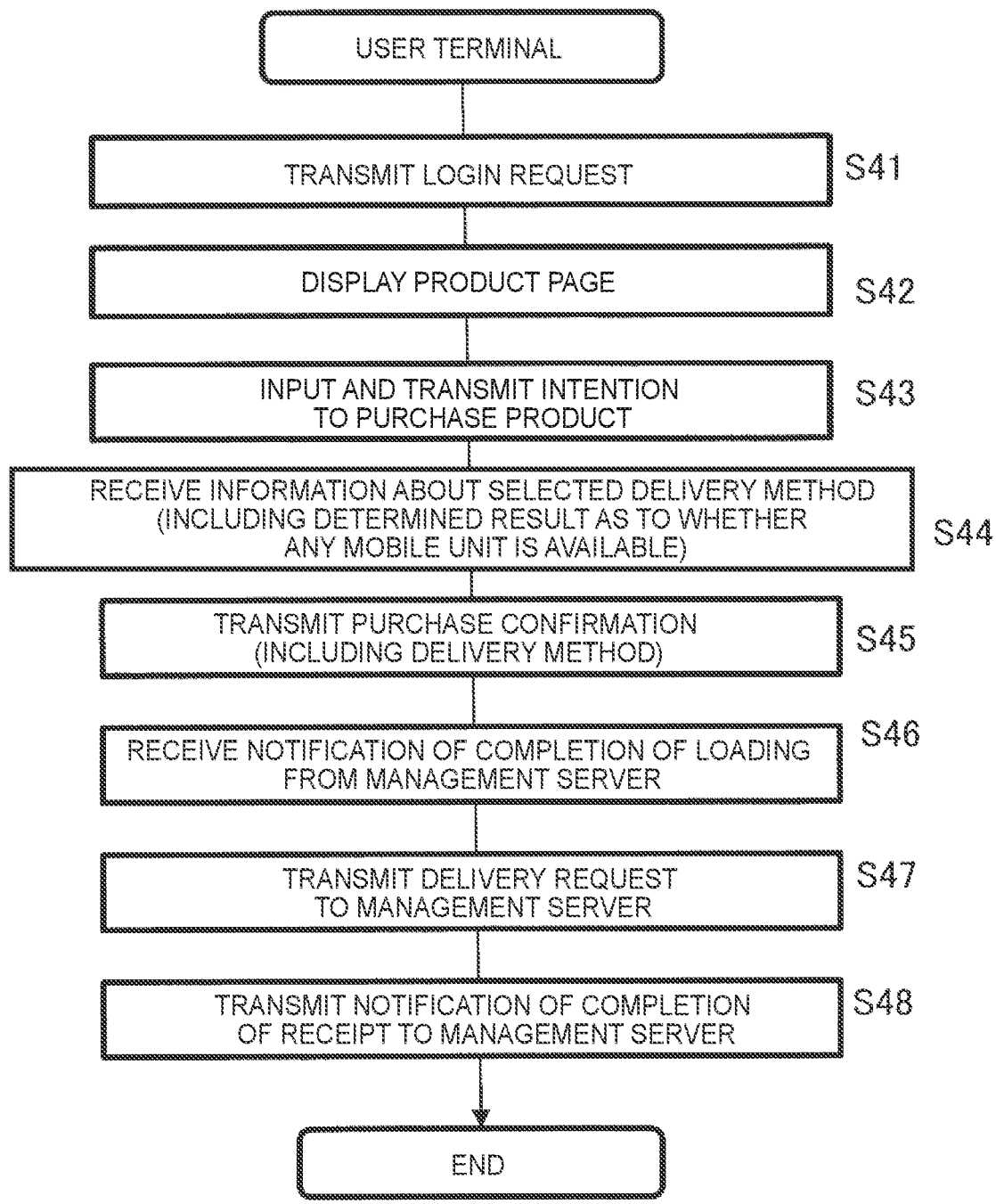
FIG. 11 is a flowchart that shows an example of a process that is executed by a control unit of a user terminal in the first operation example.
Figure 12:
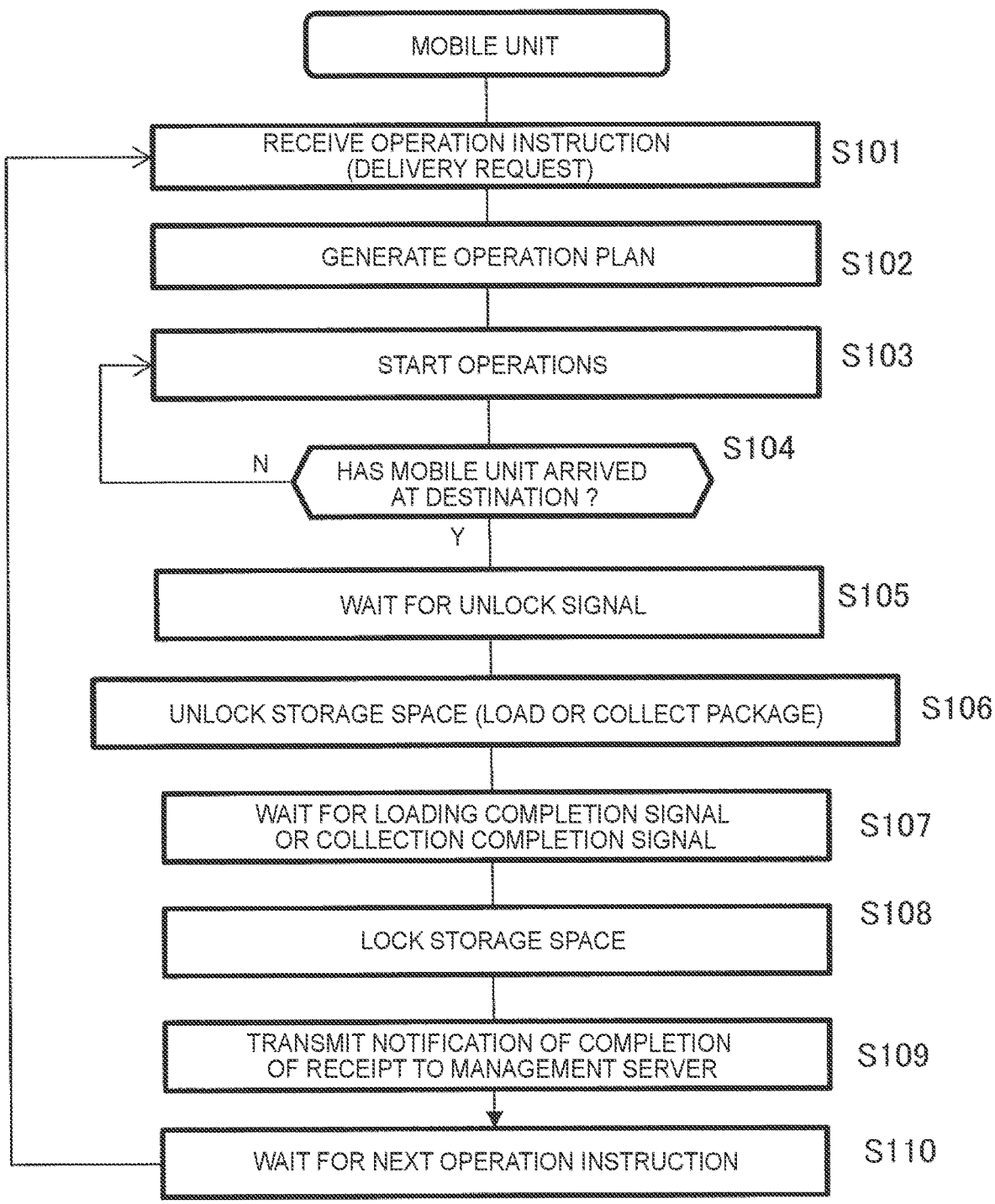
FIG. 12 is a flowchart that shows an example of a process that is executed by a control unit of the mobile unit in the first operation example.

FIG. 7 is a sequence diagram that shows a first operation example. FIG. 8 is a flowchart that shows an example of a process that is executed on the control unit 402 of the management server 400 in the first operation example. FIG. 9 is a flowchart that shows an example of a process that is executed on the control unit 412 of the delivery server 410 in the first operation example. FIG. 10 is a flowchart that shows an example of a process that is executed on the control unit 422 of the sales server 420 in the first operation example. FIG. 11 is a flowchart that shows an example of a process that is executed on the control unit 62 of the user terminal 60 in the first operation example. FIG. 12 is a flowchart that shows an example of a process that is executed on the control unit 103 of the mobile unit 100 in the first operation example.

As shown in FIG. 7, a user who desires to purchase a product accesses the online shopping site that is operated on the sales server 420 of the product sales company with the use of the user terminal 60, and logs into the online shopping site (<1> in FIG. 7, and S41 in FIG. 11). It is assumed that the user is a membership in the online shopping site and information about the user (such as user ID, name, address, phone number, mail address, and product delivery destination) is registered in advance in the table T4 (FIG. 6) in the storage device 423. Information about the user may be input by the user with the use of the input/output unit 63 at the time of purchasing a product and transmitted to the sales server 420. The control unit 422 may register the information about the user in the table T4.

When the sales server 420 receives the login request (S31 in FIG. 10) and login is successful, the control unit 422 of the sales server 420 reads information of a webpage of the online shopping site (information of a product page) that contains information about products that the user is allowed to purchase from the storage device 423, and supplies the information to the communication unit 421. The communication unit 421 transmits information of the webpage to the user terminal 60 (<2> in FIG. 7, and S32 in FIG. 10).

The user terminal 60 executes control such that the control unit 62 acquires the information of the product page, which is received by the communication unit 61, and the product page based on the information of the product page is displayed on a display device included in the input/output unit 63. With this configuration, the product page containing information that shows products is displayed on the display device of the user terminal 60 (S42 in FIG. 11).

The user sees the product page. When there is a product that the user desires to purchase, the user performs an operation to add the product to a shopping cart with the use of the input/output unit 63, and further inputs an intention to purchase the product. Information indicating a purchase intention (including the user ID) is transmitted from the communication unit 61 to the sales server 420 (<3> in FIG. 7, and S43 in FIG. 11). After that, the control unit 422 of the sales server 420 acquires the information indicating the purchase intention, which is received by the communication unit 421 (S33 in FIG. 10), consults the table T4 in the storage device 423, and reads information about a product delivery destination (for example, information stored in the table T4, such as the name, address or residence, contact information, and the like, of the delivery destination specified by the user) within the record corresponding to the user ID.

The control unit 422 transmits inquiry information as to whether the address or residence of the delivery destination is in an area in which a delivery service using any one of the mobile units 100 is available from the communication unit 421 to the management server 400 (<4> in FIG. 7, and S34 in FIG. 10). The inquiry information includes the address or residence of the delivery destination. A postal code, or the like, is applicable instead of an address or resistance.

The communication unit 401 of the management server 400 receives the inquiry information (S01 in FIG. 8), and the control unit 402 acquires the inquiry information. The control unit 402 determines whether there is an area that corresponds to the address or residence included in the inquiry information by consulting the table T1 stored in the storage device 403 (<5> in FIG. 7, and S02 in FIG. 8). When there is the area, the control unit 402 acquires the area ID of that area. A correspondence relation between an address and an area ID is stored in the table T1. When no area ID corresponding to the address or residence is registered in the table T1, this means that the user cannot receive a delivery service using any one of the mobile units 100. The control unit 402 transmits a determined result (indicating that at least one mobile unit 100 is available (OK) or no mobile unit 100 is available (NG)) to the sales server 420 (<6> in FIG. 7, and S03 in FIG. 8).

The control unit 422 of the sales server 420 acquires the determined result received by the communication unit 421 (S35 in FIG. 10), and determines whether delivery using at least one mobile unit 100 is available (S36 in FIG. 10). When the determined result indicates NG (no mobile unit 100 is available), the determined result is transmitted to the user terminal 60 (<7> in FIG. 7, and S44 in FIG. 11), after which the process of FIG. 10 ends. In contrast, when the determined result indicates OK (at least one mobile unit 100 is available), the determined result is transmitted to the user terminal 60 (<7> in FIG. 7, and S37 in FIG. 10). At this time, page information for selecting whether delivery of the package to the delivery destination is performed by the delivery company (delivery person) or performed by using the at least one mobile unit 100 is transmitted from the sales server 420 to the user terminal 60, and the control unit 62 displays such a page on the display. The user determines whether to use a delivery method using the at least one mobile unit 100 or to use an ordinary delivery method that an ordinary delivery person visits the delivery destination by seeing the page, and inputs the result into the user terminal 60 via the input/output unit 63. Furthermore, the user depresses a purchase confirmation button on the page. The communication unit 61 transmits, to the sales server 420, information about the purchased product, information about a date and time (time period) of delivery and the delivery destination, the purchase confirmation for the product, and information indicating the delivery method selected by the user (<8> in FIG. 7, and S45 in FIG. 11).

The communication unit 421 of the sales server 420 receives the purchase confirmation and the information indicating the delivery method, and the control unit 422 acquires these pieces of information (S38 in FIG. 10). The control unit 422 generates package information including information indicating the product for which purchase has been confirmed and the delivery method to the delivery destination, and transmits a delivery request to deliver the product (package), including the package information, to the delivery server 410 (<9> in FIG. 7, and S39 in FIG. 10).

In the delivery server 410, the communication unit 411 receives the delivery request, and the control unit 412 acquires the delivery request (S21 in FIG. 9). The control unit 412 generates a record regarding delivery corresponding to the delivery request, and registers the record in the table T3. After that, the control unit 412 waits until the package arrives at a delivery center corresponding to the area of the delivery destination.

As the package arrives at the delivery center, the control unit 412 of the delivery server 410 transmits, to the management server 400, a request to inquire the location of the at least one mobile unit 100 (<10> in FIG. 7, and S22 in FIG. 9). The request to inquire the location of the at least one mobile unit 100 includes information in the record registered in the delivery information table T3 and generated by the control unit 412.

In the management server 400, the location inquiry information is received by the communication unit 401, and the control unit 402 acquires the location inquiry information (S04 in FIG. 8). The control unit 402 identifies the area ID corresponding to the delivery destination information (the address or residence of the delivery destination) in the location inquiry information by consulting the table T2, compares the address or residence of the delivery destination with the current location in the record of each mobile unit 100 corresponding to the area ID, and determines a predetermined one of the mobile units 100 as the mobile unit 100 that is used for delivery. For example, the mobile unit 100 that is stopped at the station nearest from the address or residence of the delivery destination and that takes the longest time until time to start moving is set for the mobile unit that is used for delivery. This is because it is possible to avoid stopping the mobile unit 100 to load a package and ensure a time to go to a station and load a package onto the mobile unit 100. Alternatively, the mobile unit 100 may be determined on the assumption that the mobile unit 100 located closest to the address or residence of the delivery destination is brought into a stop in a loading place on the traveling route. A method of determining the mobile unit 100 other than the above-described method may be selected as needed.

As the control unit 402 determines the mobile unit 100, the control unit 402 registers the package information regarding the location inquiry into the record of the mobile unit management information in the table T1, corresponding to the mobile unit ID of the determined mobile unit 100. Thus, the control unit 402 associates the package with the mobile unit 100. The control unit 402 of the management server 400 transmits the mobile unit ID of the determined mobile unit 100 and the location information including the current location to the delivery server 410 (<11> in FIG. 7, and S05 in FIG. 8).

In the present embodiment, the assumption is made that the package is loaded onto the mobile unit 100 being stopped at the station. The control unit 412 of the delivery server 410 receives the location information (S23 in FIG. 9), consults information indicating the statuses of delivery persons, stored in the storage device 413, and, for example, randomly selects one of delivery persons who are at the delivery center and who depart for delivery from this time. Alternatively, a delivery person whose delivery route from this time is close to the current location of the mobile unit 100 (the station at which the mobile unit 100 is stopped) is selected as a person in charge of delivery of the package. In this way, a delivery person may be selected as needed in accordance with a predetermined rule. The control unit 412 transmits the terminal 70 of the selected delivery person, the package information, the mobile unit ID and current location information of the mobile unit 100, and an unlock code (password) for unlocking the storage space (loading space) of the mobile unit 100 (<12> in FIG. 7, and S24 in FIG. 9).

The control unit 72 of the delivery person terminal 70 acquires the current location information of the mobile unit 100, which is received by the communication unit 71, and displays the current location information on the display of the delivery person terminal 70. The delivery person loads the package onto his or her delivery vehicle in accordance with the package information, and goes to the station (the location at which the mobile unit 100 is stopped) that is a package loading location in accordance with the current location information. The delivery person inputs the unlock code (password) to the touch panel provided on the cover of the package storage space of the mobile unit 100 while the mobile unit 100 is stopped. The cover is, for example, locked by an electromagnetic lock (not shown), and the electromagnetic lock is unlocked when a valid unlock code is input. The cover is opened by unlocking the electromagnetic lock, and the delivery person loads the package into the storage space. As the delivery person returns the cover to a predetermined closed position, the electromagnetic lock activates, and the cover is locked.

When the delivery person completes loading, the delivery person transmits a notification of the completion of loading from the delivery person terminal 70 to the delivery server 410 (<13> in FIG. 7). The control unit 412 of the delivery server 410 acquires the notification of the completion of loading (S06 in FIG. 8). The delivery server 410 transmits the notification of the completion of loading to the management server 400 (<14> in FIG. 7). The management server 400 receives the notification of the completion of loading from the delivery server 410 (S06 in FIG. 8), and transmits the notification of the completion of loading to the user terminal 60 (<15> in FIG. 7, and S07 in FIG. 8). At this time, the control unit 412 updates the loaded package and the package information in the table T1.

The user terminal 60 receives the notification of the completion of loading together with the unlock code for unlocking the storage space (S46 in FIG. 11). The user transmits, to the management server 400, a delivery request to deliver the package to the delivery destination in order to receive the package at the delivery destination (for example, home) by operating the user terminal 60 (<16> in FIG. 7, and S47 in FIG. 11). The delivery request can include information indicating a location (specified location) as the delivery destination and specified arrival time at which the mobile unit 100 arrives at the delivery destination. The management server 400 generates an operation instruction based on the delivery request, and transmits the operation instruction to the mobile unit 100 (<17> in FIG. 7).

In S101 of FIG. 12, the control unit 103 operates as the operation plan generating unit 1031 upon receipt of the operation instruction, and generates an operation plan of the mobile unit 100 to the delivery destination (destination) (S102). The control unit 103 starts operations in accordance with the operation plan (S103). In the operations, the control unit 103 operates as the environment detection unit 1032 and the running control unit 1033.

The control unit 103 determines whether the mobile unit 100 has arrived at the destination (S104). This determination is carried out based on, for example, whether the location of the mobile unit 100 is believed to reach the destination. As the mobile unit 100 arrives at the destination, the control unit 103 stops the mobile unit 100, and enters a state of waiting for input of an unlock signal (unlock code for unlocking the cover) (S105). When the unlock code input by the user is valid, the control unit 103 unlocks the locked cover of the storage space (S106). With this configuration, when the user opens the cover and takes out the package inside, the user is allowed to receive (collect) the ordered package (product). In S107, the control unit 103 enters a state of waiting for a package loading completion signal or a package collection completion signal. The loading completion signal or the collection completion signal is generated when the user returns the cover to the original position (the closed position of the storage space). The fact that the cover has returned to the original position is detectable by a sensor (not shown), or the like. As the fact that the cover has returned to the original position is detected, the control unit 103 locks the cover, and locks the storage space (S108). The control unit 103 transmits a notification of completion of receipt of the package to the management server 400 (S109, and <18> in FIG. 7). After that, the mobile unit 100 enters a state of waiting for an operation instruction toward the next destination. Of course, when the location of the next station is registered in the mobile unit 100 in advance, the mobile unit 100 may set the location of the next station for the next destination, and may execute an operation to start moving toward the next destination.

The management server 400 receives the notification of the completion of receipt from the mobile unit 100. The management server 400 also receives the notification of the completion of receipt, input by the user, from the user terminal 60 (<19> in FIG. 7). One of these notifications of the completion of receipt may be omitted. The management server 400 transmits a notification of completion of delivery to the delivery server 410 (<20> in FIG. 7). The delivery server 410 transmits the notification of the completion of delivery to the sales server 420 (<21> in FIG. 7). In this way, delivery of the package using the mobile unit 100 is performed.

In the present embodiment, the example in which the mobile unit 100 is stopped in loading a package is described. Therefore, the processes of S101 to S104 in FIG. 12 are not required (the mobile unit 100 has already arrived at the destination), so the processes of S101 to S104 are omitted. However, when a predetermined loading location is set for a destination while the mobile unit 100 is moving, the mobile unit 100 may execute the processes of S101 to S104 in FIG. 12.

In the first operation example, the management server 400 may execute a process of tracking a package of the sales server 420 or delivery server 410, and may reply a tracked location of the package in response to an inquiry about the location of the package. The management server 400 transmits information indicating an approach of the mobile unit 100 loaded with a package to the user terminal 60 when a distance between the current location of the mobile unit 100 and the location of a package delivery destination becomes shorter than a predetermined distance. Thus, it is possible to set proper timing at which a delivery request is transmitted from the user terminal 60. These also apply to second and third operation examples (described later).

According to the first operation example, the delivery company completes work at a point at which a package is loaded onto the mobile unit 100. Therefore, even when a user is absent from a delivery destination, a delivery company is not required to revisit the delivery destination. As a result, the efficiency of delivery work of a delivery company is improved. On the other hand, when the user transmits a delivery request from the user terminal 60 to the management server 400 (<16> in FIG. 7) in a time period specified by the user for receiving the package, the mobile unit 100 that stores the package moves to the delivery destination (such as home). With this configuration, the user is allowed to receive the package at the delivery destination specified by himself or herself, so it is possible to save time and effort to go to public transportation, or the like, and receive a package and to save time and effort to take a received package home. Thus, the efficiency of receiving work of the user is also improved. The mobile unit 100 is shared among a plurality of users in an area as if a mobile delivery box is shared among a plurality of persons. With this configuration, even when users have no box for delivery of a package at home, it is possible to reduce inconvenience, such as a revisit of a delivery company.

Second Operation Example

Figure 13:
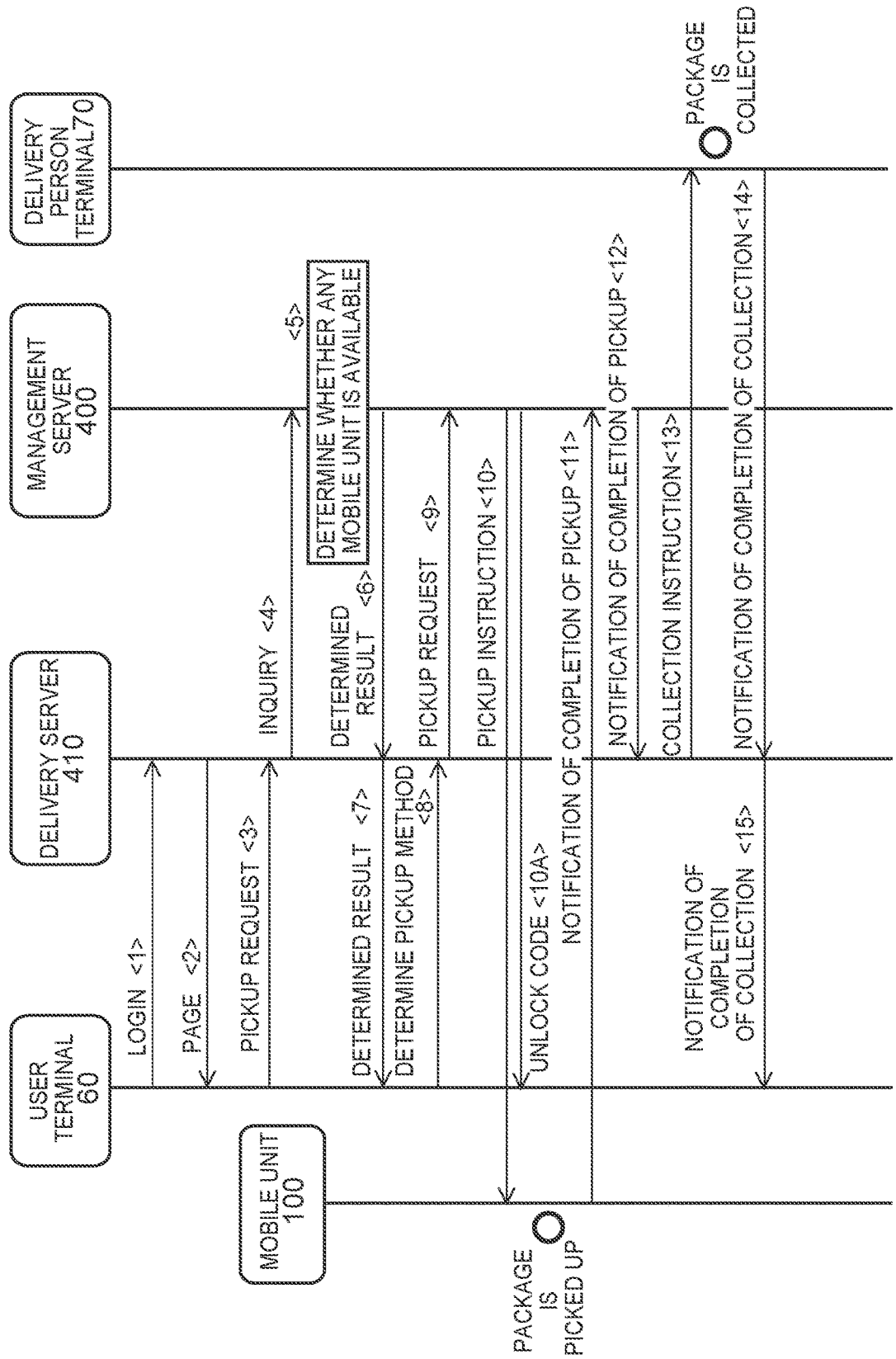
FIG. 13 is a sequence diagram that shows a second operation example.
Figure 14:
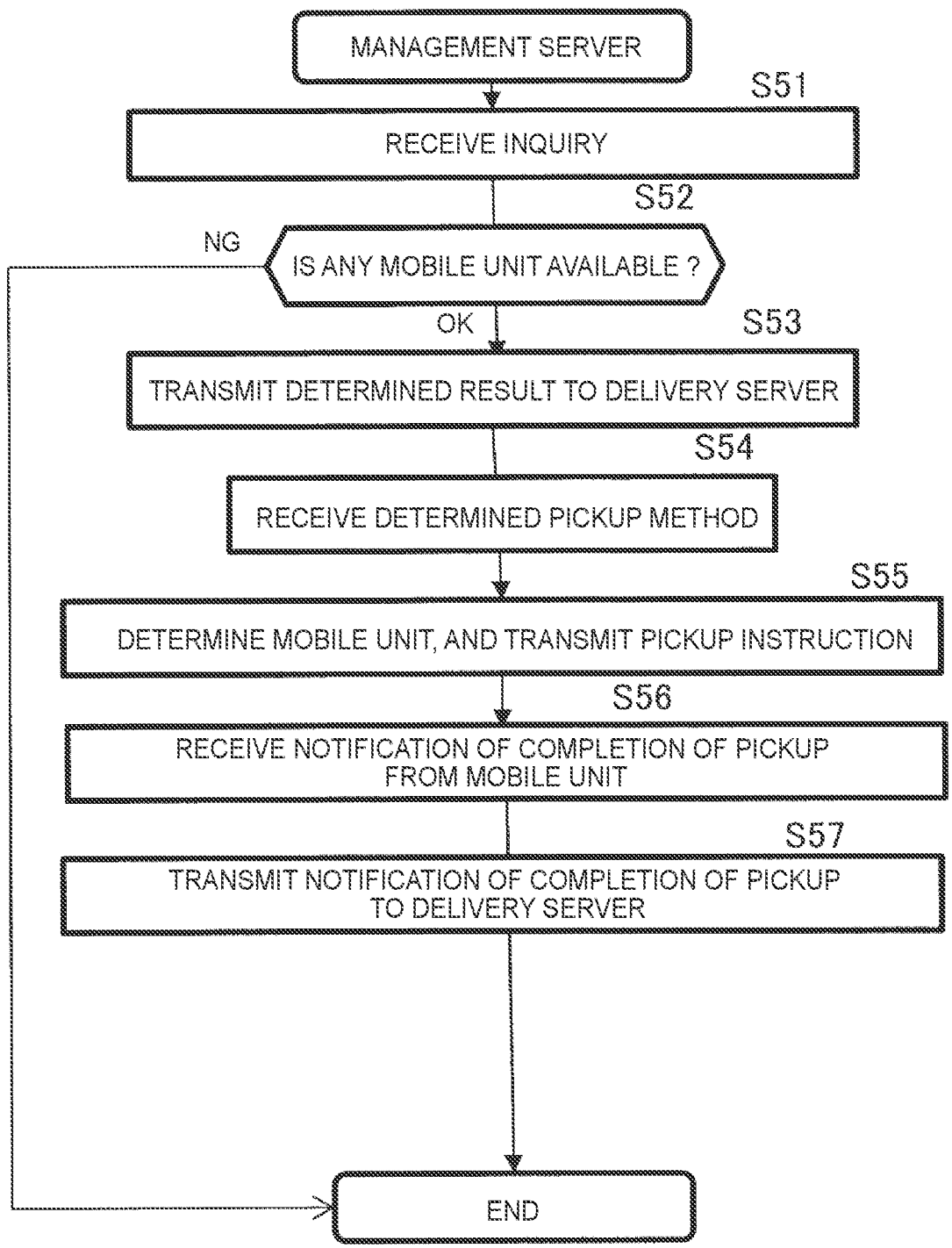
FIG. 14 is a flowchart that shows an example of a process that is executed by the control unit of the management server in the second operation example.
Figure 15:
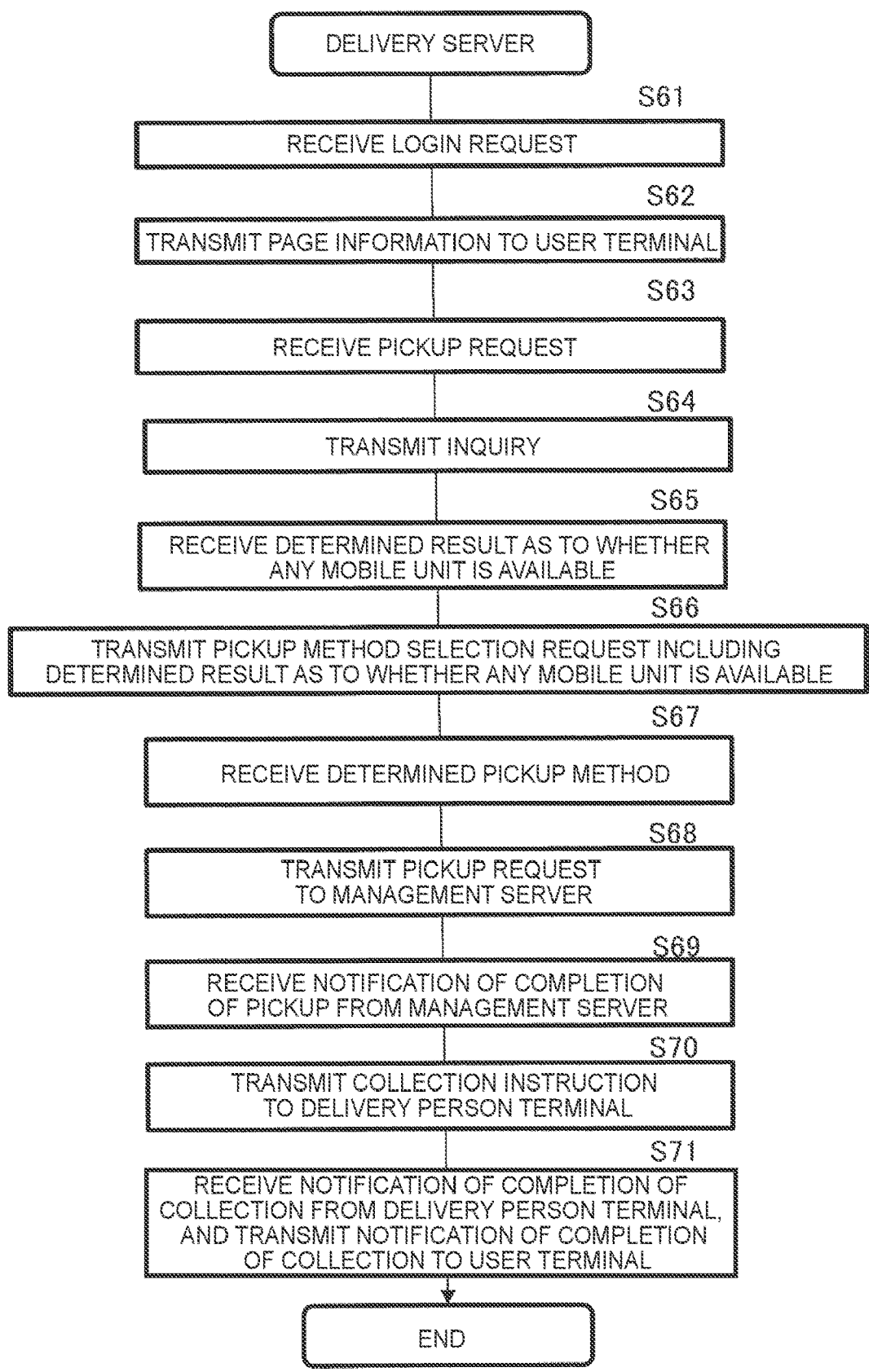
FIG. 15 is a flowchart that shows an example of a process that is executed by the control unit of the delivery server in the second operation example.
Figure 16:
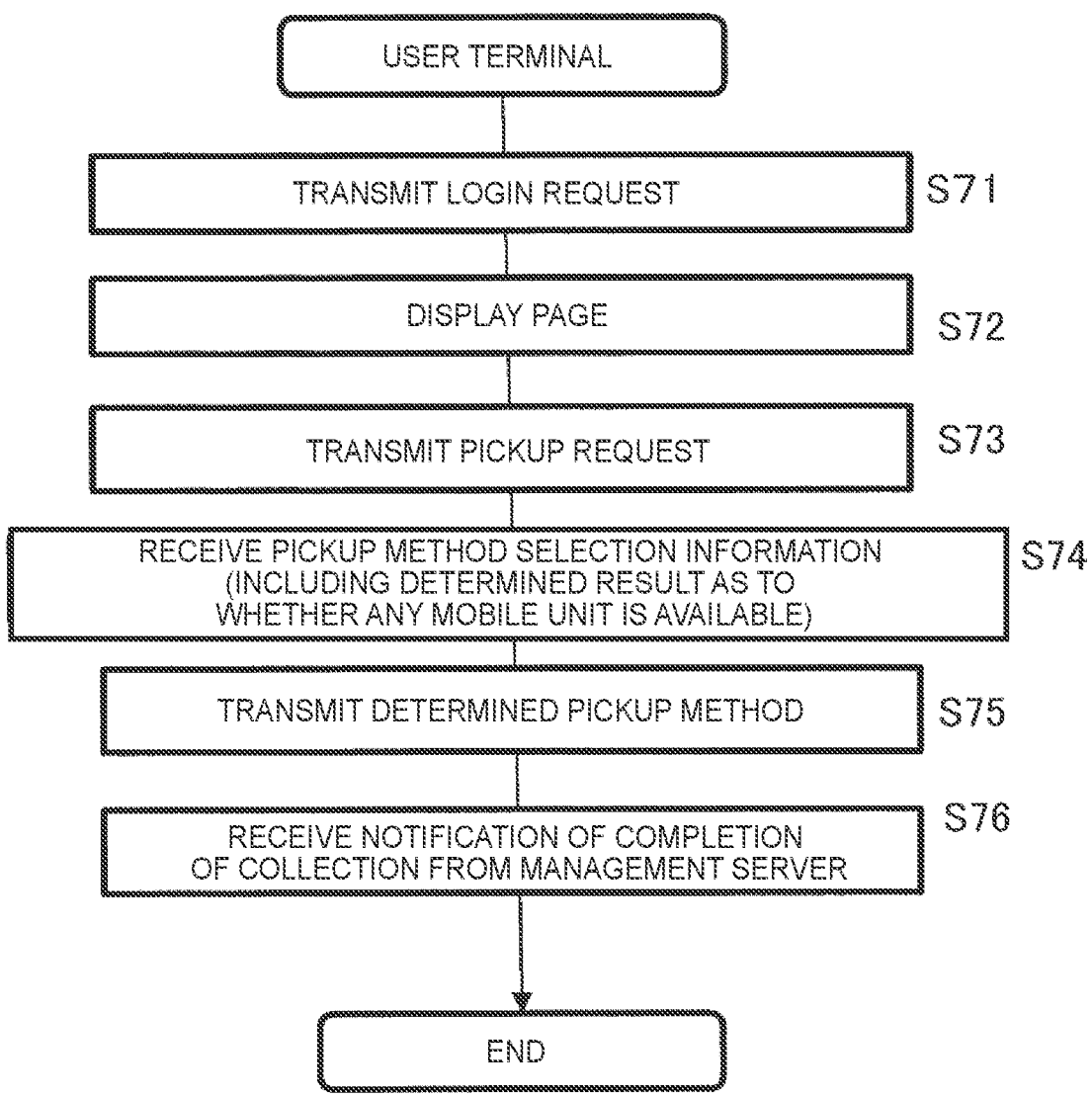
FIG. 16 is a flowchart that shows an example of a process that is executed by the control unit of the user terminal in the second operation example.
Figure 17:
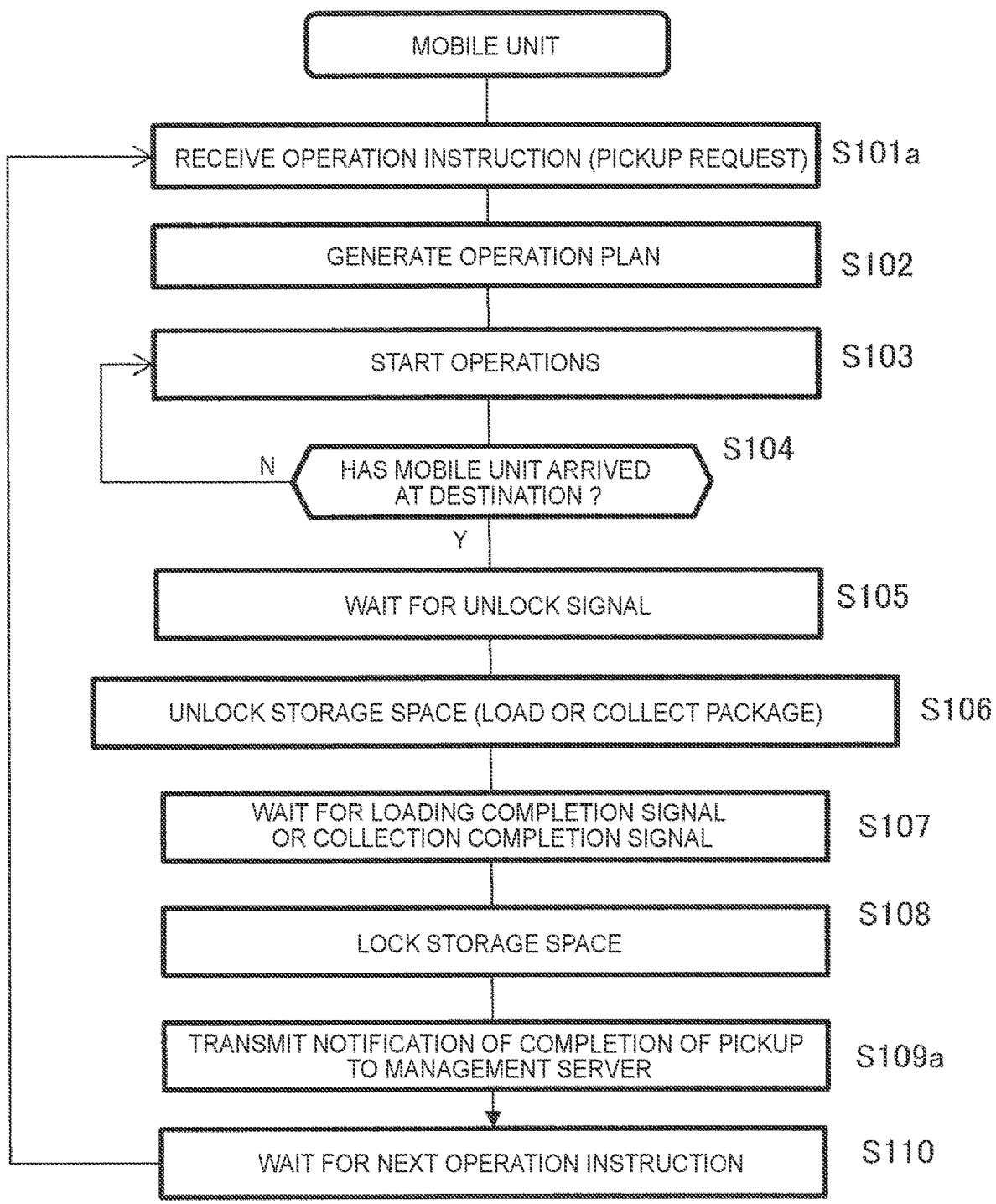
FIG. 17 is a flowchart that shows an example of a process that is executed by the control unit of the mobile unit in the second operation example.

FIG. 13 is a sequence diagram that shows the second operation example. FIG. 14 is a flowchart that shows an example of a process that is executed on the control unit 402 of the management server 400 in the second operation example. FIG. 15 is a flowchart that shows an example of a process that is executed on the control unit 412 of the delivery server 410 in the second operation example. FIG. 16 is a flowchart that shows an example of a process that is executed on the control unit 62 of the user terminal 60 in the second operation example. FIG. 17 is a flowchart that shows an example of a process that is executed on the control unit 103 of the mobile unit 100 in the second operation example. The first operation example is an operation example in the case where a package is loaded onto the mobile unit 100, while the second operation example shows an operation example in the case where a user submits a request to pick up a package.

As shown in FIG. 13, a user who desires pickup of a package logs into the website that the delivery server 410 operates by operating the user terminal 60 (<1> in FIG. 13, and S71 in FIG. 16). At this time, the delivery server 410 receives a login request (S61 in FIG. 15), and the control unit 412 of the delivery server 410 transmits, to the user terminal 60, page information for inputting information regarding delivery of a package (slip information) (<2> in FIG. 13, and S62 in FIG. 15).

The user terminal 60 displays a page based on the page information received from the delivery server 410 on the display (S72 in FIG. 16). The user inputs a pickup request to pick up the package (information to be written on a slip for the package to be delivered, that is, package information including the address, name, and phone number of a delivery destination, the content of the package, and the like) with the use of the displayed page. The pickup request is transmitted to the delivery server 410 (<3> in FIG. 13, and S73 in FIG. 16).

As the control unit 412 of the delivery server 410 receives the pickup request (S63 in FIG. 15), the control unit 412 transmits, to the management server 400, an inquiry about whether the address or residence of the user is located in an area in which at least one mobile unit 100 has been prepared (whether at least one mobile unit 100 is available for pickup) (<4> in FIG. 13, and S64 in FIG. 15). The inquiry information includes the address or residence of the delivery destination. A postal code, or the like, is applicable instead of an address or resistance.

The communication unit 401 of the management server 400 receives the inquiry information (S51 in FIG. 14), and the control unit 402 acquires the inquiry information. The control unit 402 determines whether there is an area that corresponds to the address or residence included in the inquiry information by consulting the table T1 stored in the storage device 403 (<5> in FIG. 13, and S52 in FIG. 14). When there is the area, the control unit 402 acquires the area ID corresponding to that area. The correspondence relation between an address and an area ID is stored in the table T1. When no area ID corresponding to the address or residence is registered in the table T1, this means that the user cannot receive a delivery service using any one of the mobile units 100. The control unit 402 transmits a determined result (indicating that at least one mobile unit 100 is available (OK) or no mobile unit 100 is available (NG)) to the delivery server 410 (<6> in FIG. 13, and S53 in FIG. 14).

The control unit 412 of the delivery server 410 acquires the determined result received by the communication unit 411 (S65 in FIG. 15), and transmits, to the user terminal 60, page information (pickup method selection information) for allowing the user to select a pickup method (the delivery company visits home or the at least one mobile unit 100 visits home) together with the result as to whether at least one mobile unit 100 is available (S66 in FIG. 15). When no mobile unit 100 is available, the pickup method that the at least one mobile unit 100 visits home is not provided as a choice in the page information. The user determines the pickup method by using the pickup method selection information received by the user terminal 60 in S74 in FIG. 16, and transmits the determined pickup method to the delivery server 410 (<8> in FIG. 13, and S75 in FIG. 16). The delivery server 410 receives the determined pickup method (S67 in FIG. 15). In the present embodiment, the case where the user selects the pickup method that the at least one mobile unit 100 visits home for pickup will be described as an example. In the delivery server 410, the control unit 412 generates delivery information to be registered in the table T3 based on the determined pickup method and the corresponding package information, and registers the delivery information in the table T3 in association with a delivery ID (delivery management number).

The delivery server 410 transmits, to the management server 400, a pickup request to pick up the package based on the determined pickup method (<9> in FIG. 13, and S68 in FIG. 15). Information included in the pickup request is similar to that of the first operation example. The management server 400 determines the mobile unit 100 that is used to pick up the package upon receipt of the pickup request (S54 in FIG. 14), and transmits a pickup instruction to the mobile unit 100 (<10> in FIG. 13, and S55 in FIG. 14). The pickup request includes an address for transmitting information to the user terminal 60. The management server 400 transmits, to the user terminal 60, an unlock code for unlocking the locked storage space of the mobile unit 100 (<10A> in FIG. 13). The delivery server 410 is able to learn the address of the user terminal 60 based on information from the user terminal 60 or a source address of data.

The case where the mobile unit 100 of which the current location is closest to the home address of the user is determined as the mobile unit 100 will be described. FIG. 17 is a flowchart that shows an example of a process that is executed on the control unit 103 of the mobile unit 100 according to the second operation example. A process that is executed on the mobile unit 100 differs from that of the first operation example (FIG. 12) in that S101a is provided instead of S101 and S109a is provided instead of S109. S101a differs from S101 of the first operation example in that an operation instruction based on a pickup request instead of a delivery request is received. S109a differs from S109 of the first operation example in that a notification of completion of pickup instead of a notification of completion of receipt is transmitted to the management server 400. Other than the above, the process of the second operation example is the same as the process of the first operation example (the process of FIG. 12).

The management server 400 receives a notification of completion of pickup from the mobile unit 100 (<11> in FIG. 13, and S56 in FIG. 14). The management server 400 transmits the notification of the completion of pickup to the delivery server 410 (<12> in FIG. 13, and S57 in FIG. 14). The notification of the completion of pickup includes information that indicates the operation schedule of the mobile unit 100 loaded with the package.

The delivery server 410 receives the notification of the completion of pickup (S69 in FIG. 15), selects a collector who collects the package from the mobile unit 100, and transmits a collection instruction to the delivery person terminal 70 of the collector (<13> in FIG. 13, and S70 in FIG. 15). A collector is selected by, for example, identifying the location of the station at which the mobile unit 100 enters a stopped state next in the operation schedule and transmitting a collection instruction to the delivery person terminal 70 of a delivery person who is closest to or near the location of the station. A collector may be selected by a method other than the above method.

The collection instruction includes delivery information regarding the package that is collected from the mobile unit 100. The package information is read from the table T3 with the use of the delivery ID. The delivery person who performs collection work identifies the station to which the delivery person should go by referring to the operation schedule information displayed on his or her delivery person terminal 70, unlocks the locked cover of the storage space with the use of the unlock code received from the management server 400 at that station, and collects the package. As the collection work completes, the delivery person terminal 70 transmits a notification of completion of collection to the delivery server 410 (<14> in FIG. 13). The delivery server 410 transmits the notification of the completion of collection to the user terminal 60 (<15> in FIG. 13, and S71 in FIG. 15).

According to the second operation example, since the mobile unit 100 comes to user's home to pick up a package, the efficiency of work at the time of consigning delivery of a package is improved. Since the delivery company just needs to collect a package from the mobile unit 100 loaded with the package, a collection place or collection time is more flexible than that when the delivery company visits user's home, so it is possible to efficiently perform collection work.

Third Operation Example

FIG. 18 is a sequence diagram that shows the third operation example. The third operation example, as well as the second operation example, shows an operation example in the case where a user submits a request to pick up a package. Among the processes shown in FIG. 18, the processes of <1> to <12> in FIG. 18 are the same as those of the second operation example, so the description thereof is omitted. In contrast, the processes of <13> to <17> in FIG. 18 are different from those of the second operation example. In <13> in FIG. 18, the delivery server 410 transmits, to the management server 400, a transfer request to transfer a package. The transfer request includes the address of a transfer place in which the package is transferred to the mobile unit 100. For example, the address of a delivery center of a delivery company in an area may be applied as the transfer place.

In <14> in FIG. 18, the management server 400 transmits a package transfer instruction to the mobile unit 100. The transfer instruction includes information that identifies the package, information indicating the address of the transfer place, the mobile unit ID of the mobile unit 100, and the like.

In the mobile unit 100, similar operations to those shown in FIG. 17 are executed. That is, the mobile unit 100 moves to the address of the transfer place, stops in the transfer place, and unlocks the locked cover of the storage space based on an unlock signal. Therefore, the delivery person opens the cover, and takes transfer of the package inside. As the cover is returned to the closed position, the cover is locked, and the storage space is locked. The mobile unit 100 transmits a notification of completion of transfer to the management server 400 (<15> in FIG. 18). The management server 400 that has acquired the notification of the completion of transfer transmits the notification of the completion of transfer to the delivery server 410 (<16> in FIG. 18). The delivery server 410 transmits the notification of the completion of transfer to the user terminal 60 (<17> in FIG. 18).

In the third operation example, as well as the second operation example, since the mobile unit 100 comes to a home address for pickup, it is possible to suitably perform package pickup work. In the third operation example, the mobile unit 100 is able to move to the address of a delivery company (for example, the address of a delivery center) and transfer a package to the delivery company. Since the mobile unit 100 comes to a transfer place, the delivery company is allowed to efficiently perform package delivery work.

Operation and Advantageous Effects of Embodiment

According to the embodiment, since the mobile unit 100 moves to a location specified by at least one of a delivery request and a pickup request, it is possible to load a package onto the mobile unit 100 at that location or collect a package from the mobile unit 100 at that location. Therefore, a person who delivers a package completes his or her work just by loading the package onto the mobile unit 100 at the specified location, so it is possible to save time and effort to revisit a package delivery destination (such as a home of a recipient of the package). In addition, since it is possible to instruct the mobile unit 100 to move to a location specified for delivery (recipient's home), the recipient is able to save time and effort to go to take a package to a place different from the home or to save time and effort to take a package home. With this configuration, a time required for delivery is shortened, and the efficiency of work is improved. For pickup of a package as well, since it is possible to call the mobile unit 100 to a specified location, such as a home, that is suitable for a pickup client, time and effort of a client for delivery of a package are saved, and, in addition, since the mobile unit 100 visits client's home, or the like, instead of a delivery company, time and effort of the delivery company are reduced. With this configuration, it is possible to improve the efficiency regarding delivery and pickup.

The management server 400 (which may be regarded as a management device) determines whether at least one of delivery and pickup using the mobile unit 100 is available based on whether the location specified as a package delivery destination is located in the area. With this configuration, a method in which the delivery company goes to the specified location or a method in which the mobile unit goes to the specified location may be selected as a package delivery method.

When there are a plurality of candidates for the mobile unit 100 in the area, the management server 400 (management device) selects the mobile unit 100 from among the plurality of candidates based on the location information of each of the plurality of candidates and the specified location. With this configuration, it is possible to shorten a time required for delivery or pickup and improve the efficiency of work by selecting the mobile unit 100 at a location appropriate for the specified location from among the plurality of mobile units 100 in the area.

The management server 400 supplies the mobile unit 100 with an instruction such that the mobile unit 100 travels in the area. With this configuration, the mobile unit 100 that is used as a storage space for a package travels in the area, so each user who is in the area and uses the mobile unit is allowed to use the mobile unit near his or her specified location. As a result, it is possible to shorten a time required for delivery or pickup and improve the efficiency of work. That is, an environment equivalent to a situation in which a plurality of users in an area share a mobile delivery box is obtained.

The mobile unit 100 has a lockable and unlockable loading space for loading a package. The management server 400 transmits information for unlocking the locked loading space to a terminal of a person (the user terminal 60 or the delivery person terminal 70) who performs at least one of delivery and pickup of a package. With this configuration, even when a user or a delivery person does not have a mechanical key for the package loading space of the mobile unit 100, the delivery person or a pickup person is allowed to unlock the locked loading space. When the loading space is locked, the security of a package is ensured. The components of the above-described embodiment may be combined as needed without departing from the scope of the disclosure.

What is claimed is:

1. A package delivery support system comprising:
   a mobile unit prepared in an area; and
   a sales server configured to acquire an intention of a user to purchase a product and transmit inquiry information as to whether an address or residence of a delivery destination is in an area in which the mobile unit is available;
   a delivery server configured to manage information regarding a package; and
   a management device configured to manage the mobile unit, the management device including circuitry configured to:
   acquire at least one of a delivery request to deliver a package loaded on the mobile unit and a pickup request to pick up a package with the mobile unit, and
   supply the mobile unit with an instruction for causing the mobile unit to move to a location specified by the at least one of the delivery request and the pickup request and an instruction for causing the mobile unit to move to a collection place where a delivery company collects the package, and
   wherein the delivery server is configured to transmit, to the delivery company, a collection instruction including delivery information regarding the package to be collected,
   the management device is configured to receive the inquiry information, determine whether the mobile unit is available, and transmit a determination result as to whether the mobile unit is available to the sales server, and
   purchase confirmation for the product is determined based on the determination result.

2. The package delivery support system according to claim 1, wherein the sales server transmits, to a terminal of the user, page information for selecting whether a delivery of the package is performed by the delivery company or performed by the mobile unit.

3. The package delivery support system according to claim 1, wherein the circuitry is further configured to:
   determine whether an area ID for the address or residence of the delivery destination is present in a database of the management device; and
   determine that the mobile unit is available in response to determining that the area ID for the address or residence of the delivery destination is present in the database.

4. The package delivery support system according to claim 1, wherein the circuitry is further configured to:
   receive a notification of completion of receipt from the mobile unit;
   receive a notification of completion of receipt from a terminal of the user; and
   transmit a notification of completion of delivery in response to receiving the notification of completion of receipt from the mobile unit and the notification of completion of receipt from the terminal of the user.

5. The package delivery support system according to claim 1, wherein the delivery server is further configured to:
   transmit delivery information regarding the package to be collected to a terminal of a person; and
   receive a notification of completion of loading from the terminal of the person.

6. The package delivery support system according to claim 5, wherein the circuitry is further configured to:
   receive a notification of completion of loading from the delivery server; and
   transmit a notification of completion of loading to a terminal of the user in response to receiving the notification of completion of loading from the delivery server.

7. The package delivery support system according to claim 1, wherein the circuitry is further configured to:
   transmit the determination result that the mobile unit is available to the sales server, and
   the sales server transmits the determination result to a terminal of the user and receives the purchase confirmation from the terminal of the user.

8. The package delivery support system according to claim 1, wherein:
   the mobile unit has a lockable and unlockable loading space for loading the package; and
   the circuitry is further configured to transmit information for unlocking the loading space to a terminal of a person who performs at least one of delivery and pickup of the package.

9. A non-transitory computer-readable storage medium storing a program, the program being executable on a computer of a management device configured to manage a mobile unit prepared in an area, the program, when executed on the computer, causing the computer to execute operations comprising:

acquiring at least one of a delivery request to deliver a package loaded on the mobile unit and a pickup request to pick up a package with the mobile unit;

supplying the mobile unit with an instruction for causing the mobile unit to move to a location specified by the at least one of the delivery request and the pickup request and an instruction for causing the mobile unit to move to a collection place where a delivery company collects the package of a product; and determining whether the mobile unit is available based on information indicating a purchase intention of a user, wherein purchase confirmation for the product is determined based on a result as to whether the mobile unit is available.

10. The non-transitory computer-readable storage medium according to claim 9, wherein the operations further comprise:

determining whether an area ID for an address or residence of a delivery destination of the delivery request is present in a database of the management device; and determining that the mobile unit is available in response to determining that the area ID for the address or residence of the delivery destination is present in the database.

11. The non-transitory computer-readable storage medium according to claim 9, wherein the operations further comprise:

receiving a notification of completion of receipt from the mobile unit;

receiving a notification of completion of receipt from a terminal of the user; and transmitting a notification of completion of delivery in response to receiving the notification of completion of receipt from the mobile unit and the notification of completion of receipt from the terminal of the user.

12. The non-transitory computer-readable storage medium according to claim 9, wherein the operations further comprise:

transmitting delivery information regarding the package to be collected to a terminal of a person; and receiving a notification of completion of loading from the terminal of the person.

13. The non-transitory computer-readable storage medium according to claim 12, wherein the operations further comprise:

receiving a notification of completion of loading from a delivery server; and transmitting a notification of completion of loading to a terminal of the user in response to receiving the notification of completion of loading from the delivery server.

14. The non-transitory computer-readable storage medium according to claim 9, wherein the operations further comprise:

transmitting a determination result that the mobile unit is available to a sales server, wherein the sales server transmits the determination result to a terminal of the user and receives the purchase confirmation from the terminal of the user.

15. A package delivery support method comprising:

acquiring, by a management device for a mobile unit prepared in an area, at least one of a delivery request to deliver a package loaded on the mobile unit and a pickup request to pick up a package with the mobile unit;

transmitting a collection instruction to a delivery company, the collection instruction including delivery information regarding the package to be collected by the delivery company;

supplying, by the management device, the mobile unit with an instruction for causing the mobile unit to move to a location specified by the at least one of the delivery request and the pickup request and an instruction for causing the mobile unit to move to a collection place where a delivery company collects the package;

acquiring an intention of a user to purchase a product by a sales server and transmit, to the management device, inquiry information as to whether an address or residence of a delivery destination is in an area in which the mobile unit is available; and acquiring the inquiry information by the management device, determining whether the mobile unit is available, and transmitting a determination result as to whether the mobile unit is available to the sales server, wherein purchase confirmation for the product is determined based on the determination result.

16. The package delivery support method according to claim 15, further comprising:

determining whether an area ID for the address or residence of the delivery destination is present in a database of the management device; and determining that the mobile unit is available in response to determining that the area ID for the address or residence of the delivery destination is present in the database.

17. The package delivery support method according to claim 15, further comprising:

receiving a notification of completion of receipt from the mobile unit;

receiving a notification of completion of receipt from a terminal of the user; and transmitting a notification of completion of delivery in response to receiving the notification of completion of receipt from the mobile unit and the notification of completion of receipt from the terminal of the user.

18. The package delivery support method according to claim 15, further comprising:

transmitting delivery information regarding the package to be collected to a terminal of a person; and receiving a notification of completion of loading from the terminal of the person.

19. The package delivery support method according to claim 15, further comprising:

receiving a notification of completion of loading from a delivery server; and transmitting a notification of completion of loading to a terminal of the user in response to receiving the notification of completion of loading from the delivery server.

20. The package delivery support method according to claim 15, further comprising:

transmitting the determination result that the mobile unit is available to a sales server, wherein the sales server transmits the determination result to a terminal of the user and receives the purchase confirmation from the terminal of the user.

* * * * *